(12) United States Patent
Shi et al.

(10) Patent No.: US 12,177,621 B2
(45) Date of Patent: Dec. 24, 2024

(54) HEADSET COMMUNICATION SYSTEM

(71) Applicant: SHENZHEN SHOKZ CO., LTD., Guangdong (CN)

(72) Inventors: Xianwei Shi, Shenzhen (CN); Qian Chen, Shenzhen (CN); Zhongqi Wu, Shenzhen (CN); Fen You, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 220 days.

(21) Appl. No.: 17/816,707

(22) Filed: Aug. 1, 2022

(65) Prior Publication Data

US 2022/0377451 A1 Nov. 24, 2022

Related U.S. Application Data

(63) Continuation of application No. PCT/CN2021/089094, filed on Apr. 22, 2021.

(30) Foreign Application Priority Data

Apr. 30, 2020 (CN) .......................... 202020718180.8
Apr. 30, 2020 (CN) .......................... 202020725564.2

(51) Int. Cl.
*H04R 1/10* (2006.01)
*H04B 1/3827* (2015.01)
(Continued)

(52) U.S. Cl.
CPC ........... *H04R 1/1041* (2013.01); *H04B 1/385* (2013.01); *H04R 1/08* (2013.01); *H04R 1/1008* (2013.01);
(Continued)

(58) Field of Classification Search
CPC ...... H04R 1/1041; H04R 1/08; H04R 1/1008; H04R 1/105; H04R 1/1075;
(Continued)

(56) References Cited

U.S. PATENT DOCUMENTS

2005/0286734 A1* 12/2005 Wang ..................... G02C 11/10
381/381
2014/0086355 A1 3/2014 Liu
(Continued)

FOREIGN PATENT DOCUMENTS

CN 203632832 U 6/2014
CN 204467052 U * 7/2015
(Continued)

OTHER PUBLICATIONS

International Search Report in PCT/CN2021/089094 mailed on Jul. 9, 2021, 7 pages.

*Primary Examiner* — Akelaw Teshale
(74) *Attorney, Agent, or Firm* — METIS IP LLC

(57) ABSTRACT

Disclosed in the embodiments of the present application is a headset communication system. The headset communication system comprises: a bone conduction headset, comprising a first Bluetooth module; an intercom device, comprising a first external interface; an external communication module, comprising a second external interface and a second Bluetooth module. The external communication module is detachably provided in the intercom device and being coupled to the intercom device by means of the first external interface and the second external interface, and the bone conduction headset and the intercom device perform Bluetooth pairing by means of the first Bluetooth module and the second Bluetooth module so as to establish a Bluetooth connection.

20 Claims, 12 Drawing Sheets

(51) Int. Cl.
    *H04R 1/08*           (2006.01)
    *H04W 76/10*         (2018.01)

(52) U.S. Cl.
    CPC ........... *H04R 1/105* (2013.01); *H04R 1/1075* (2013.01); *H04W 76/10* (2018.02); *H04B 2001/3866* (2013.01); *H04R 2201/107* (2013.01); *H04R 2420/07* (2013.01); *H04R 2460/13* (2013.01)

(58) Field of Classification Search
    CPC .......... H04R 2201/107; H04R 2420/07; H04R 2460/13; H04R 1/1066; H04R 5/0335; H04B 1/385; H04B 2001/3866; H04B 1/3827; H04W 76/10; H04M 2250/02; H04M 1/6066
    See application file for complete search history.

(56) References Cited

U.S. PATENT DOCUMENTS

| | | | |
|---|---|---|---|
| 2019/0230207 A1* | 7/2019 | Cheng | H04W 4/48 |
| 2020/0076463 A1* | 3/2020 | Liu | H04B 1/3838 |
| 2020/0083993 A1* | 3/2020 | Naik | H04W 28/04 |

FOREIGN PATENT DOCUMENTS

| | | | |
|---|---|---|---|
| CN | 107508612 A | 12/2017 | |
| CN | 208079064 U | 11/2018 | |
| CN | 211880588 U | 11/2020 | |
| CN | 211880592 U | 11/2020 | |

\* cited by examiner

HEADSET COMMUNICATION SYSTEM

CROSS REFERENCE

This application is a Continuation of International Application No. PCT/CN2021/089094, filed on Apr. 22, 2021, which claims priority of Chinese Application No. 202020725564.2, filed on Apr. 30, 2020, and Chinese Application No. 202020718180.8, filed on Apr. 30, 2020, the entire contents of each are hereby incorporated by reference.

TECHNICAL FIELD

The present disclosure relates to a field of headset communication technology, and more particularly, relates to a headset communication system.

BACKGROUND

Intercom devices play a very important role in trunking communication. The intercom devices are used for communication among group members and are widely used in civil, industrial, police, and other fields. However, confidentiality of voice communications of intercom devices is weak. In addition, when external environment is relatively noisy, it will cause a great interference to the voice communications of the intercom devices, and it is difficult for users to hear the contents, which affects service quality of the intercom devices. Moreover, the voice communication mode of the intercom devices is single, which limits the usage of the intercom devices.

SUMMARY

One of the embodiments of the present disclosure may provide a headset communication system. The headset communication system may comprise: a bone conduction headset, an intercom device, and an external communication module. The bone conduction headset may comprise a first Bluetooth module. The intercom device may comprise a first external interface. The external communication module may comprise a second external interface and a second Bluetooth module. The external communication module may be detachably arranged on the intercom device and is coupled to the intercom device through the first external interface and the second external interface. The bone conduction headset and the intercom device may be Bluetooth paired through the first Bluetooth module and the second Bluetooth module to establish a Bluetooth connection.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
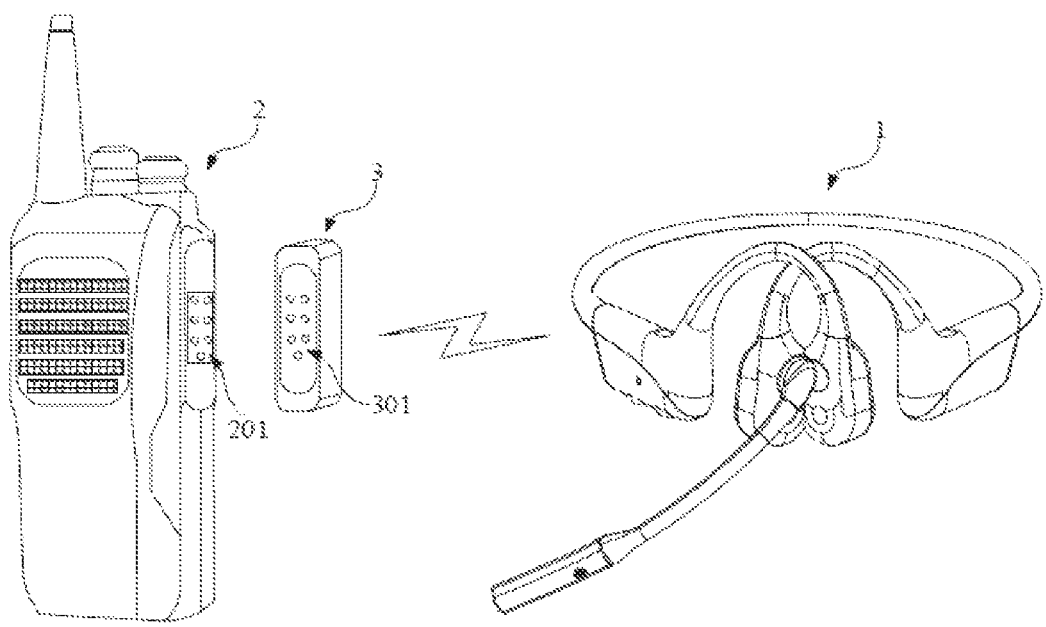
FIG. 1 is a schematic diagram illustrating an exemplary structure of a headset communication system according to some embodiments of the present disclosure.

In order to illustrate the technical solutions related to the embodiments of the present disclosure, a brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It will be understood that the term "system", "device", "unit" and/or "module" used herein is one method for distinguishing different components, elements, parts, sections, or assemblies at different levels. However, the terms may be displaced by another expression if they achieve the same purpose.

As shown in the description and claims, the singular forms "a", "an", "one", and/or "the" may be intended to include the plural forms as well, unless the context clearly indicates otherwise. Generally, the terms "comprise," "comprises," and/or "comprising," "include," "includes," and/or "including," only indicate that the steps and elements that have been clearly identified are included, and these steps and elements do not constitute an exclusive list, the methods or devices may also contain other steps or elements.

A flowchart is used in the present disclosure to explain the operation performed by the system according to the embodiment of the present disclosure. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Figure 2:
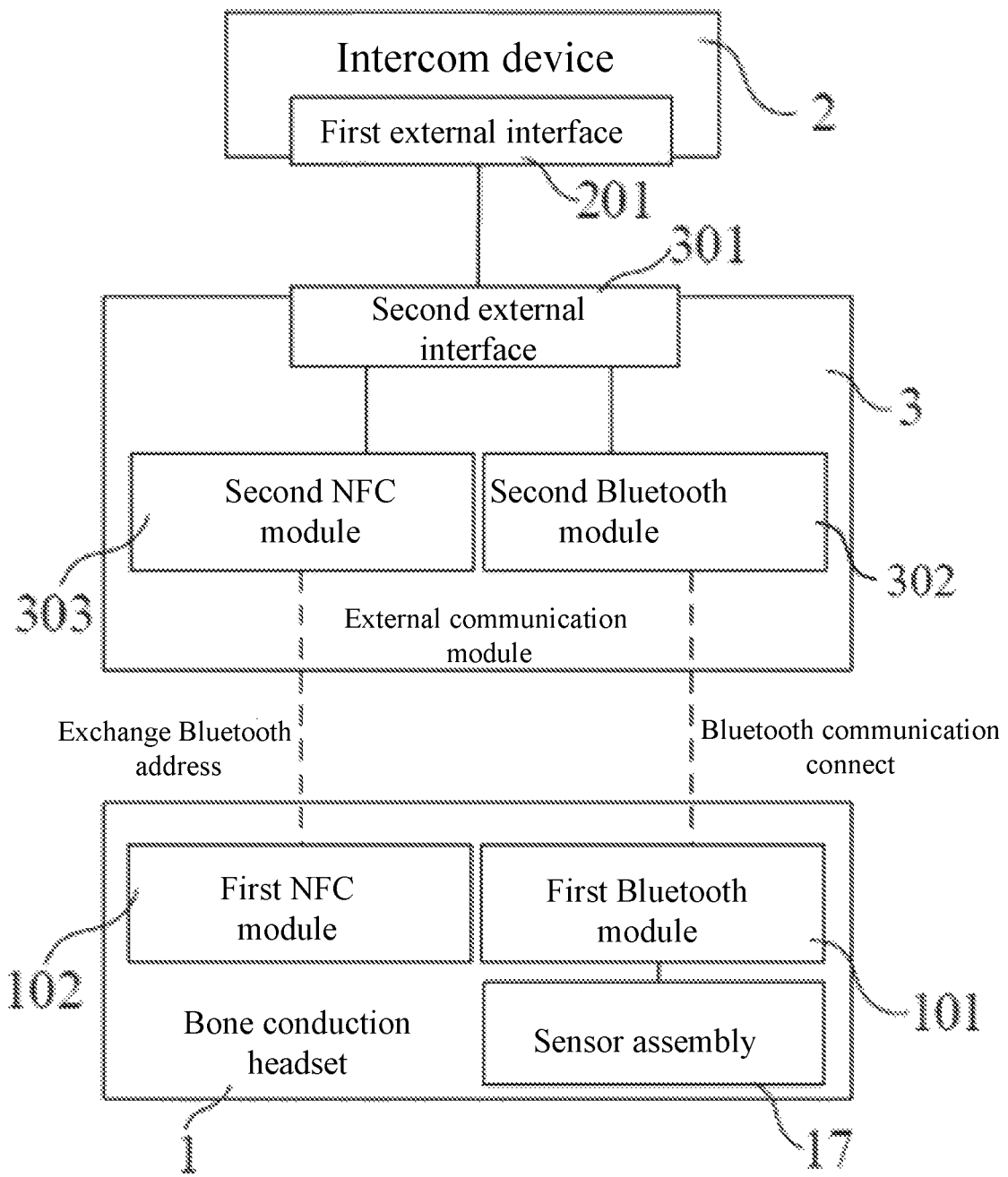
FIG. 2 is a block schematic diagram illustrating an exemplary circuit of a headset communication system according to some embodiments of the present disclosure.

FIG. 1 is a structural diagram illustrating an exemplary structure of a headset communication system according to some embodiments of the present disclosure. FIG. 2 is a block schematic diagram illustrating an exemplary circuit of a headset communication system according to some embodiments of the present disclosure.

In some embodiments, the headset communication system may include a bone conduction headset 1, an intercom device 2, and an external communication module 3.

The bone conduction headset converts audio into mechanical vibration of different frequencies and uses human bones as mediums to transmit mechanical vibration, so as to transmit sound waves to auditory nerves. In this way, users may receive sound without passing through the external auditory canal and tympanic membrane of the ear. In some embodiments, the bone conduction headset 1 may have a Bluetooth function. As shown in FIG. 2, the bone conduction headset 1 may include a first Bluetooth module 101. The first Bluetooth module 101 may include a control master chip. The control master chip may have a micro control unit and a Bluetooth transceiver unit, and the Bluetooth transceiver unit may be connected to a wireless transmission antenna. The first Bluetooth module 101 may be configured to implement a Bluetooth communication function.

The intercom device 2, i.e., an interphone, may be a terminal device of trunking communication and may also be used as a wireless communication device in mobile communications. Generally, the interphone converts an electrical signal of audio into a radio frequency carrier signal through a transmitting assembly and then transmits the radio frequency carrier signal by an antenna through amplification, filtering, or the like, so as to transmit user's voice. The antenna may receive an input signal to form an audio signal through corresponding conversion, filtering, amplification, mixing, and other processing, and play the audio signal out through the speaker so that the user may hear the audio sent by other intercom devices. In some embodiments, the intercom device may be a common device with an intercom function, which is not limited in the present disclosure.

In some scenarios, the intercom device may be usually directly held by hand to perform sound pickup or play functions. It may be inconvenient to hold or carry the intercom device when the user is operating with both hands, such as in high-altitude operations or carrying. In view of this, in some embodiments of the present disclosure, the bone conduction headset 1 may be effectively wirelessly connected with the intercom device 2 through Bluetooth communication. In some embodiments, the external communication module 3 may be used as the medium for Bluetooth communication between the bone conduction headset 1 and the intercom device 2.

In some embodiments, the intercom device 2 may include a first external interface 201. That is, the intercom device 2 may provide the first external interface 201 for expanding functions of the intercom device 2, and different functions may be realized by connecting to different external modules. For example, the external module may include an external communication module, a storage module, a fault detection module, a power detection module, etc. The external communication module may be used as a medium for Bluetooth communication between the bone conduction headset 1 and the intercom device 2. The storage module may store information of the intercom device 2. The fault detection module and the power detection module may ensure a stable operation of the intercom device 2. The first external interface 201 may also be used for external terminals to program the intercom device 2, etc. The first external interface 201 may include a plurality of touch spots (e.g., seven touch spots) arranged at intervals (shown in FIG. 1 but not marked).

In some embodiments, the external communication module 3 may include a second external interface 301 and a second Bluetooth module 302. The external communication module 3 may be detachably arranged on the intercom device 2. For example, the external communication module 3 may be fixed to the intercom device 2 in a clamping manner. The second external interface 301 may also have as many touch spots as the first external interface 201. When the external communication module 3 is installed in the intercom device 2, the first external interface 201 and the second external interface 301 may be connected. The external communication module 3 may be coupled to the intercom device 2 through the first external interface 201 and the second external interface 301. The intercom device 2 may realize the Bluetooth function through the external communication module 3.

As shown in FIG. 2, the intercom device 2 may establish a Bluetooth connection with the bone conduction headset 1 through the external communication module 3. When the Bluetooth connection between the intercom device 2 and the bone conduction headset 1 is established through the external communication module 3, the bone conduction headset 1 may be configured to control the intercom device 2. For example, the bone conduction headset 1 may be configured to receive the audio received by the intercom device 2, or the microphone of the bone conduction headset 1 may be configured to send the corresponding voice, and other functions of the intercom device 2 may be controlled. Of course, the intercom device 2 may also control the bone conduction headset 1.

In some embodiments, when the bone conduction headset 1 is not worn by a user, if the bone conduction headset 1 picks up sound or plays voice, the sound cannot be effectively picked up or the user cannot hear the voice transmitted by the bone conduction headset 1. In this case, the sound pickup and/or voice playback may be carried out through the intercom device 2 so that the played voice may be heard and/or effectively picked up. When the bone conduction headset 1 is worn, the bone conduction headset 1 may be configured to pick up sound and/or play voice, so that the user may send voice or hear the played voice. In order to switch device functions according to actual usage, in some embodiments, a sensor may be configured to sense a wearing mode or activate the bone conduction headset 1.

In some embodiments, the bone conduction headset 1 may further include a sensor assembly 17 for detecting whether the bone conduction headset 1 is worn. In some embodiments, when the bone conduction headset 1 is worn, the bone conduction headset 1 may be controlled to pick up sound and or play voice; when the bone conduction headset 1 is not worn, the intercom device 2 may be controlled to pick up sound and/or play voice.

In some embodiments, the sensor assembly 17 for sensing whether the bone conduction headset 1 is worn may include one or more of an acceleration sensor, a gravity sensor, a gyroscope sensor, a touch sensor, a distance sensor, and a touch spot sensor. For example, a gyroscope sensor and an acceleration sensor may be provided in the bone conduction headset 1 to activate the bone conduction headset 1 according to the actual situation by detecting the user's wearing condition or wearing posture.

In some embodiments, the sensor assembly 17 may include an optical sensor that detects whether the bone conduction headset is worn by transmitting and/or receiving an optical signal. The optical sensor may be a low beam sensor, which may emit corresponding optical signals. When the bone conduction headset 1 is worn, the low beam sensor may reflect the optical signals to generate a reflected light. When the bone conduction headset 1 is not worn, the low beam sensor may not generate reflected light. The low beam sensor may detect whether the bone conduction headset 1 is worn or measure distance according to receiving the reflected light. In some embodiments, the low beam sensor may include a near-infrared sensor. It should be noted that in other embodiments, different sensors and combinations of different sensors may be selected according to actual situations.

In some embodiments, when the sensor assembly 17 detects that the bone conduction headset 1 is worn under a state that the bone conduction headset 1 and the intercom device 2 are in Bluetooth connection, the bone conduction headset 1 may be controlled to pick up sound and/or play voice, while the intercom device 2 may be not used to pick up sound and/or play voice. That is, when the bone conduction headset 1 is worn, the headset communication system works through the microphone of the bone conduction headset 1 to pick up sound and/or the speaker to play voice. In some embodiments, when the sensor assembly 17 detects that the bone conduction headset 1 is not worn, the intercom device 2 may be controlled to pick up sound and/or play voice, while the bone conduction headset 1 may be not used to pick up sound and/or play voice. That is, when the bone conduction headset 1 is not worn, the headset communication system may be configured to pick up sound by the microphone of the intercom device 2 and/or play voice by the speaker.

In some embodiments, when the sensor assembly 17 detects that the bone conduction headset 1 is not worn, the bone conduction headset 1 and the intercom device 2 may pick up sound at the same time, and the intercom device 2 may play voice. In some embodiments, when the sensor assembly 17 detects that the bone conduction headset 1 is worn, the bone conduction headset 1 and the intercom device 2 may pick up sound at the same time, and the bone conduction headset 1 may play voice. The sensor assembly 17 may detect whether the bone conduction headset 1 is worn, so as to facilitate the above automatic switching of the headset communication system, thereby avoiding omissions of voice information, adapting to different use scenarios, and improving work efficiency.

In some embodiments, in order to facilitate rapid Bluetooth connection between the bone conduction headset 1 and the intercom device 2, a Bluetooth address may be quickly exchanged between the bone conduction headset 1 and the intercom device 2 to facilitate the rapid pairing. As shown in FIG. 2, the bone conduction headset 1 may have a near-field communication (NFC) function, and may include a first NFC module 102. The first NFC module 102 may be configured to realize the near-field communication function. The external communication module 3 may further include a second NFC module 303, which may enable the intercom device 2 to realize the near-field communication.

In some other embodiments, the bone conduction headset may also include a ZigBee communication module. For example, the intercom device 2 may send pairing request information to the bone conduction headset 1. In response to the received the pairing request information, the bone conduction headset 1 may send a personal identification code request information to the intercom device 2 for pairing with the bone conduction headset 1.

In some embodiments, the personal identification code may be input into the intercom device 2 by the user, and sent to the bone conduction headset 1, so as to check whether the personal identification code received by the bone conduction headset 1 corresponds to a pre-stored personal identification code stored in the bone conduction headset. If the received personal identification code does not correspond to the pre-stored personal identification code stored in the bone conduction headset, the bone conduction headset 1 may retransmit the personal identification code request information to the intercom device 2. If the received personal identification code corresponds to the pre-stored personal identification code stored in the bone conduction headset, the bone conduction headset 1 and the intercom device 2 may be paired.

In some embodiments, the bone conduction headset 1 and the intercom device 2 may exchange Bluetooth addresses through the near-field communication between the first NFC module 102 and the second NFC module 303, thereby causing the first Bluetooth module 101 and the second Bluetooth module 302 may perform Bluetooth pair to establish a Bluetooth connection. For the above Bluetooth address exchange, the following methods may be used.

A first method: the bone conduction headset 1 may send a Bluetooth address to the intercom device 2, which may save the time for the intercom device 2 to search and select the bone conduction headset 1. That is, the first NFC module 102 may store or acquire the Bluetooth address of the first Bluetooth module 101. When the first NFC module 102 and the second NFC module 303 perform near-field communication, the first NFC module 102 may send the Bluetooth address to the second NFC module 303, so that the external communication module 3 may obtain the Bluetooth address of the first Bluetooth module 101, thereby realizing the Bluetooth address exchange, and then quickly pairing and connecting.

A second method: the intercom device 2 may send the Bluetooth address to the bone conduction headset 1, which may save the time for the bone conduction headset 1 to search and select the intercom device 2. That is, the second NFC module 303 may store or acquire the Bluetooth address of the second Bluetooth module 302. When the first NFC module 102 and the second NFC module 303 perform the near-field communication, the second NFC module 303 may send the Bluetooth address of the second Bluetooth module 302 to the first NFC module 102, so that the bone conduction headset 1 may obtain the Bluetooth address of the second Bluetooth module 302, thereby realizing Bluetooth address exchange, and then quickly pairing and connecting.

A third method: both the intercom device 2 and the bone conduction headset 1 actively exchange each other's Bluetooth addresses, thereby saving time for searching and selecting each other, and realizing fast pairing and connection. That is, the first NFC module 102 may store or acquire the Bluetooth address of the first Bluetooth module 101, and the second NFC module 303 may store or acquire the Bluetooth address of the second Bluetooth module 302. When the first NFC module 102 and the second NFC module 303 perform near-field communication, the first NFC module 102 and the second NFC module 303 may exchange each other's Bluetooth addresses to realize the exchange of the Bluetooth addresses.

The intercom device 2 may realize a fast Bluetooth connection through the second NFC module 303 of the external communication module 3 and the first NFC module 102 of the bone conduction headset 1, so that the intercom device 2 may quickly match different bone conduction headsets 1. Take the industrial field operation as an example, different workers may be equipped with different bone conduction headsets 1. For example, two workers may share one intercom device 2, the two workers may alternately use the shared intercom device 2 during a shift. The intercom device 2 may be quickly connected through the bone conduction headset 1. When a worker is on duty, the worker may use his/her bone conduction headset 1 and intercom device 2 to achieve "the bone conduction headset 1 and the intercom device 2 may be connected as long as the bone conduction headset 1 touches the intercom device 2", and then he/she may use the headset communication system including intercom device 2 and bone conduction headset 1. When the worker leaves work and a second worker start to work on duty, the second worker may also use the bone conduction headset 1 and the intercom device 2 through "achieve "the bone conduction headset 1 and the intercom device 2 may be connected as long as the bone conduction headset 1 touches the intercom device 2", and then use the headset communication system including the intercom device 2 and the bone conduction headset 1, so as to form an "independent" and "shared" operation logic. The term "independent" may refer that everyone may use their own bone conduction headset 1, and the term "shared" may refer that everyone may use the same intercom device 2. The headset communication system may also perform individual identification on the bone conduction headset 1, so that multiple people may use the same intercom device 2, which may realize rapid switching, and may also realize the function of attendance clocking and personal identity recognition.

The intercom device 2 and the bone conduction headset 1 may quickly pair Bluetooth through near-field communication to establish a Bluetooth connection. When the bone conduction headset 1 is worn, the bone conduction headset 1 may release the user's ears and transmit sound through bone conduction, which may reduce the impact of ambient noise on sound transmission, and improve the quality of voice communication. Moreover, playing the audio signal received by the intercom device 2 through the bone conduction headset 1 or picking up sound transmitted from one intercom device 2 to another intercom device 2 through the bone conduction headset 1 may avoid the traditional way of intercom broadcasting, and may protect privacy. In addition, for factory workshops and other application scenarios, users may also notice the changes in the surrounding environment while using the bone conduction headset 1 for intercom communication, it may ensure the safety of users.

For the bone conduction headset 1, the first NFC module 102 may be a passive NFC module. The first NFC module 102 may store the Bluetooth address of the first Bluetooth module 101, and may send the Bluetooth address of the first Bluetooth module 101 to the second NFC module 303. Alternatively, the first NFC module 102 may also be an active NFC module, which may send the Bluetooth address of the first Bluetooth module 101 or receive the Bluetooth address of the second Bluetooth module 302 sent by the second NFC module 303. Similarly, the second NFC module 303 may also be a passive NFC module or an active NFC module.

In some embodiments, the first NFC module 102 may be attached to a battery assembly of the bone conduction headset 1, which is easy to install, simple in structure, and space-saving. When a Bluetooth connection with the intercom device 2 is required, the corresponding position of the battery assembly of the bone conduction headset 1 may be close to the external communication module 3 of the intercom device 2, and Bluetooth pairing may be carried out quickly.

In some embodiments, the two ends of the bone conduction headset 1 adjacent to the left ear and the right ear may include a first NFC module 102 and a first Bluetooth module 101 respectively, and the two first Bluetooth modules 101 at both ends may establish a connection through TWS (true wireless stereo). In an actual pairing process, the first NFC module 102 at either end of the left ear and the right ear may communicate with the second NFC module 303, so as to realize the rapid pairing of the first Bluetooth module 101 and the second Bluetooth module 302 at either end of the left ear and the right ear.

Figure 3:
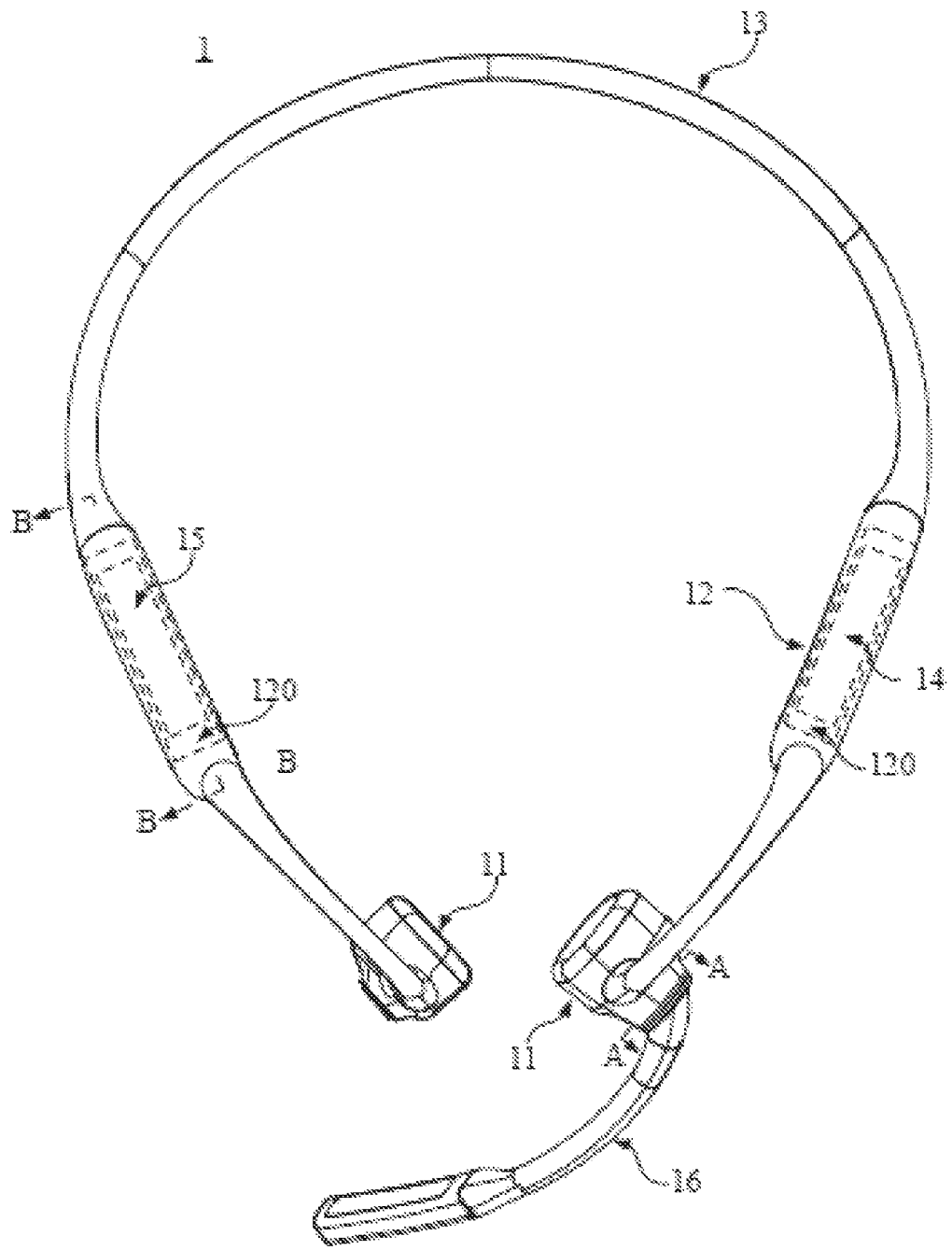
FIG. 3 is a schematic diagram illustrating an exemplary top view of an overall structure of a bone conduction headset according to some embodiments of the present disclosure.
Figure 4:
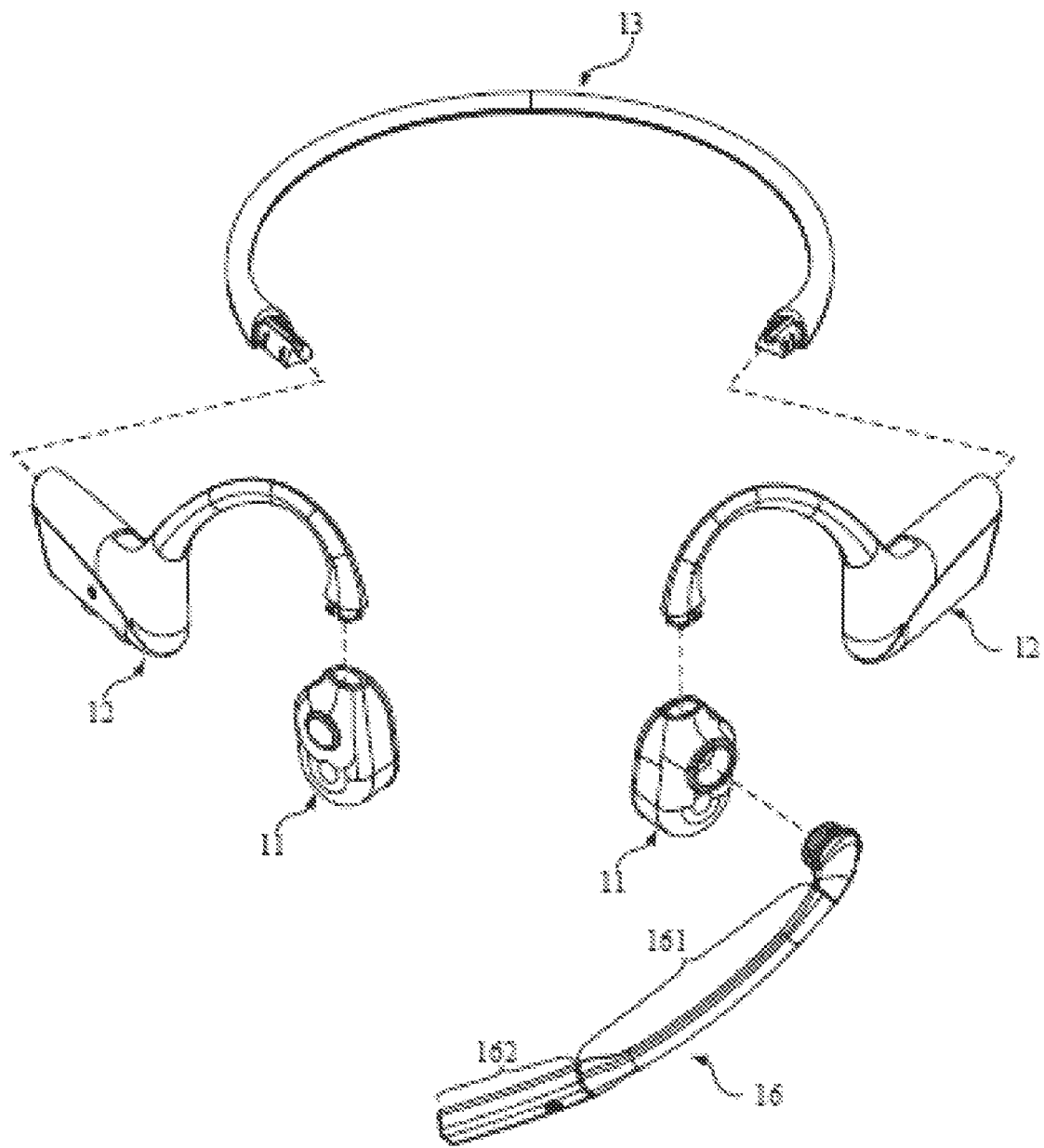
FIG. 4 is a schematic diagram illustrating an exemplary overall explosion structure of a bone conduction headset according to some embodiments of the present disclosure.

FIG. 3 is a schematic diagram illustrating an exemplary top view of an overall structure of a bone conduction headset according to some embodiments of the present, and FIG. 4 is a schematic diagram illustrating an exemplary overall explosion structure of a bone conduction headset according to some embodiments of the present disclosure.

In some embodiments, as shown in FIG. 3, the bone conduction headset may also include an ear hook assembly 12. Taking the sensor assembly 17 including an optical sensor as an example, the ear hook assembly may be provided with a window that transmits the optical signal of the optical sensor at the position close to an ear root of a user when the user is wearing the bone conduction headset bone conduction headset. Alternatively, the window may be set in a runway shape. For the detailed description of the window, please refer to the relevant description in FIG. 9 of the present disclosure, which may not be repeated here.

In some embodiments, as shown in FIGS. 3 and 4, the bone conduction headset may include two speaker assemblies 11, two ear hook assemblies 12, a rear hook assembly 13 connected between the two ear hook assemblies 12, a battery assembly 14, and a control circuit assembly 15.

In some embodiments, the two speaker assemblies 11 may be connected to two ear hook assemblies 12, respectively, and the ear hook assembly 12 may be connected between the rear hook assembly 13 and the speaker assembly 11. The ear hook assembly 12 may be formed with an accommodating space 120. The accommodating space 120 of one ear hook assembly 12 may be configured to accommodate the battery assembly 14, and the accommodating space 120 of the other ear hook assembly 12 may be configured to accommodate the control circuit assembly 15. The battery assembly 14 may be configured to supply power to the bone conduction headset 1, and the control circuit assembly 15 may be configured to control operations of the bone conduction headset 1 and realize the corresponding operation.

In some embodiments, the bone conduction headset 1 may include a microphone assembly 16 for picking up sound. The microphone assembly 16 may be rotatably connected to the speaker assembly 11. The microphone assembly 16 may include an elastic connecting rod 161 and a sound pickup assembly 162. A count (or number) of the microphone assemblies 16 may be one, which may be connected to one of the two speaker assemblies 11. For example, the microphone assembly 16 may be connected to speaker assembly 11 corresponding to battery assembly 14. In other embodiments, each speaker assembly 11 may be connected to a microphone assembly 16. As shown in FIG. 4, one end of the elastic connecting rod 161 may be connected to the speaker assembly 11. The other end of the elastic connecting rod 161 may be connected to the sound pickup assembly 162. The sound pickup assembly 162 may have one or more microphones. For example, a count (or number) of microphones in the sound pickup assembly 162 may be greater than or equal to two, and the microphones may be arranged at intervals. For example, one microphone may be located at the end of the sound pickup assembly 162 away from the speaker assembly 11, and the other microphones may be located at the side where the sound pickup assembly 162 is connected to the end. It is convenient for multiple microphones to work together, which may reduce noise and improve the quality of sound pickup. The bone conduction headset 1 may convert audio into mechanical vibration. That is, when the speaker assembly 11 plays the corresponding audio, the corresponding voice frequency band of the audio may cause the speaker 113 to generate the corresponding vibrations. In some embodiments, the elastic connecting rod 161 may be configured to achieve that when the vibration of the voice frequency band generated by the speaker assembly 11 transmitted from one end of the elastic connecting rod 161 to the other end of the elastic connecting rod 161, an average amplitude attenuation rate of the vibration of the voice frequency band may be not less than the predetermined attenuation rate threshold. For example, the average amplitude attenuation rate may be not less than 35%. For another example, the average amplitude attenuation rate may be not less than 45%. For another example, the average amplitude attenuation rate may be not less than 50%. For another example, the average amplitude attenuation rate may be not less than 55%. For another example, the amplitude attenuation rate may be not less than 60%. For another example, the amplitude attenuation rate may be not less than 70%.

In actual use, the mechanical vibration generated by the speaker assembly 11 of the bone conduction headset 1 may adversely affect the sound pickup effect, such as echo, of the microphone assembly 16. Therefore, when the vibration of the voice frequency band generated by the speaker assembly 11 transmitted from one end of the elastic connecting rod 161 to the other end of the elastic connecting rod 161, the elastic connecting rod 161 may be arranged so that the average amplitude attenuation rate may be not less than the predetermined attenuation rate threshold (e.g., 35%). In this way, the elastic connecting rod 161 may effectively absorb the vibrations in the process of vibration transmission, and reduce the vibration amplitudes transmitted from one end of the elastic connecting rod 161 to the other end, thus reducing the vibration of the sound pickup assembly 162 caused by the vibration of the speaker assembly 11, effectively reducing the impact of the vibration of the speaker assembly 11 on the sound pickup effect of the sound pickup assembly 162, and improving the quality of sound pick up.

Figure 5:
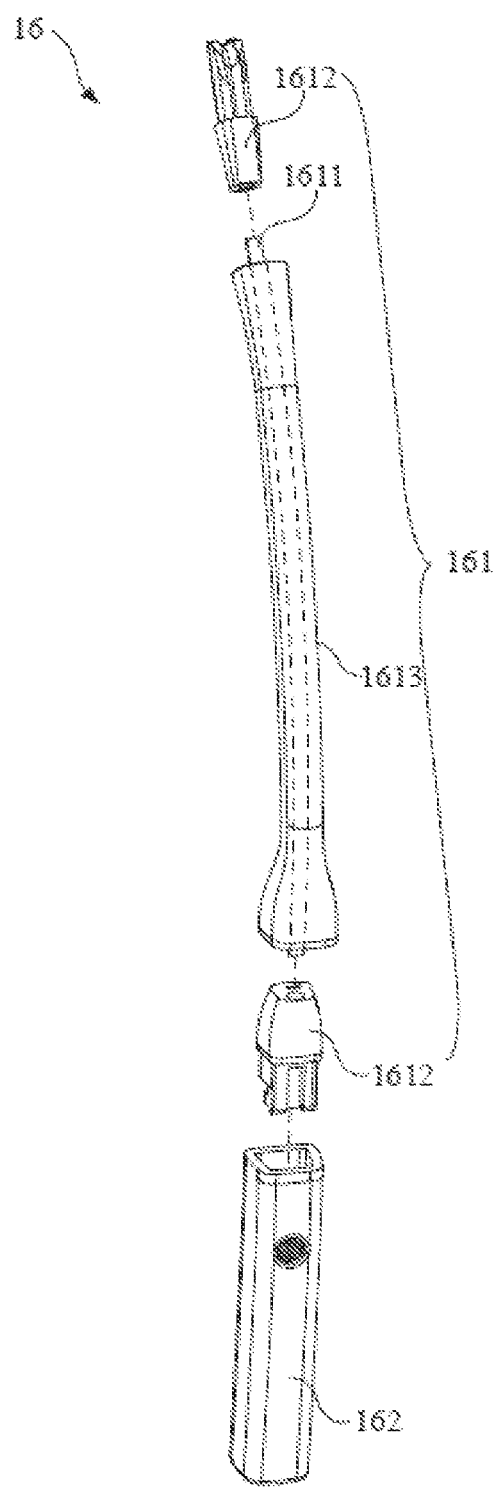
FIG. 5 is a schematic diagram illustrating an exemplary structural disassembly of a microphone assembly in a bone conduction headset according to some embodiments of the present disclosure.

FIG. 5 is a schematic diagram illustrating an exemplary structural disassembly of a microphone assembly in a bone conduction headset according to some embodiments of the present disclosure.

In some embodiments, as shown in FIG. 5, the elastic connecting rod 161 may include a microphone elastic wire 1611 and a connector 1612 connected to both ends of the microphone elastic wire 1611. That is, both ends of the microphone elastic wire 1611 may be connected to a connector 1612, respectively. One of the connectors 1612 may be used for plug-fitting with the sound pickup assembly 162. The other connector 1612 may be used for plug-fitting with the speaker assembly 11. The two connectors 1612 may have the same or different plug structures, which may be adapted to the corresponding plug structures of the sound pickup assembly 162 and the speaker assembly 11, respectively.

In some embodiments, the elastic modulus of the microphone elastic wire 1611 may be 70-90 GPa. Alternatively, the elastic modulus of microphone elastic wire 1611 may be 75-85 GPa. Alternatively, the elastic modulus of the microphone elastic wire 1611 may be 80-84 GPa. Alternatively, the elastic modulus of the microphone elastic wire 1611 may be 81-83 GPa. The material of the microphone elastic wire 1611 may be spring steel, titanium, or other metallic or non-metallic materials. By setting the elastic modulus of the microphone elastic wire 1611 to 70-90 GPa, the microphone elastic wire 1611 may have a good ability to absorb vibration, and meet the requirements of the vibration absorption capacity of the microphone assembly 16, thereby improving the quality of sound pick up of the sound pickup assembly 162.

In some embodiments, as shown in FIG. 5, the elastic connecting rod 161 may include a microphone elastic coating 1613 coated on the periphery of the microphone elastic wire 1611, and the elastic modulus of the microphone elastic coating 1613 may be 0.5-2 GPa. Alternatively, the elastic modulus of the microphone elastic coating 1613 may be 0.8-1.5 GPa. Alternatively, the elastic modulus of the microphone elastic coating 1613 is 1.2-1.4 GPa. The microphone elastic coating 1613 may further cover part of the connector 1612, thereby protecting the microphone elastic wire 1611 and the connector 1612. The material of the microphone elastic coating 1613 may be silica, rubber, plastic, etc. Alternatively, the microphone elastic coating 1613 may be provided with a wire channel along its length direction, and the wire channel may be arranged in parallel with the microphone elastic wire 1611 at intervals. The connector 1612 may be provided with an embedded slot for connecting the wire channel, and the wire group for connecting the sound pickup assembly 162 may enter the wire channel through the embedded slot of the adjacent connector 1612, and then enter the speaker assembly 11 through another connector 1612.

By setting the elastic modulus of the microphone elastic coating 1613 to 0.5-2 GPa, and because the microphone elastic coating 1613 may be wrapped outside the microphone elastic wire 1611, the vibration transmitted by the microphone elastic wire 1611 may be further absorbed, thereby forming an internal and external coordinated vibration absorption effect, which may greatly improve the vibration absorption effect of the microphone assembly 16, effectively reduce the vibration transmitted to the sound pickup assembly 162, and improve the quality of sound pickup.

Figure 6:
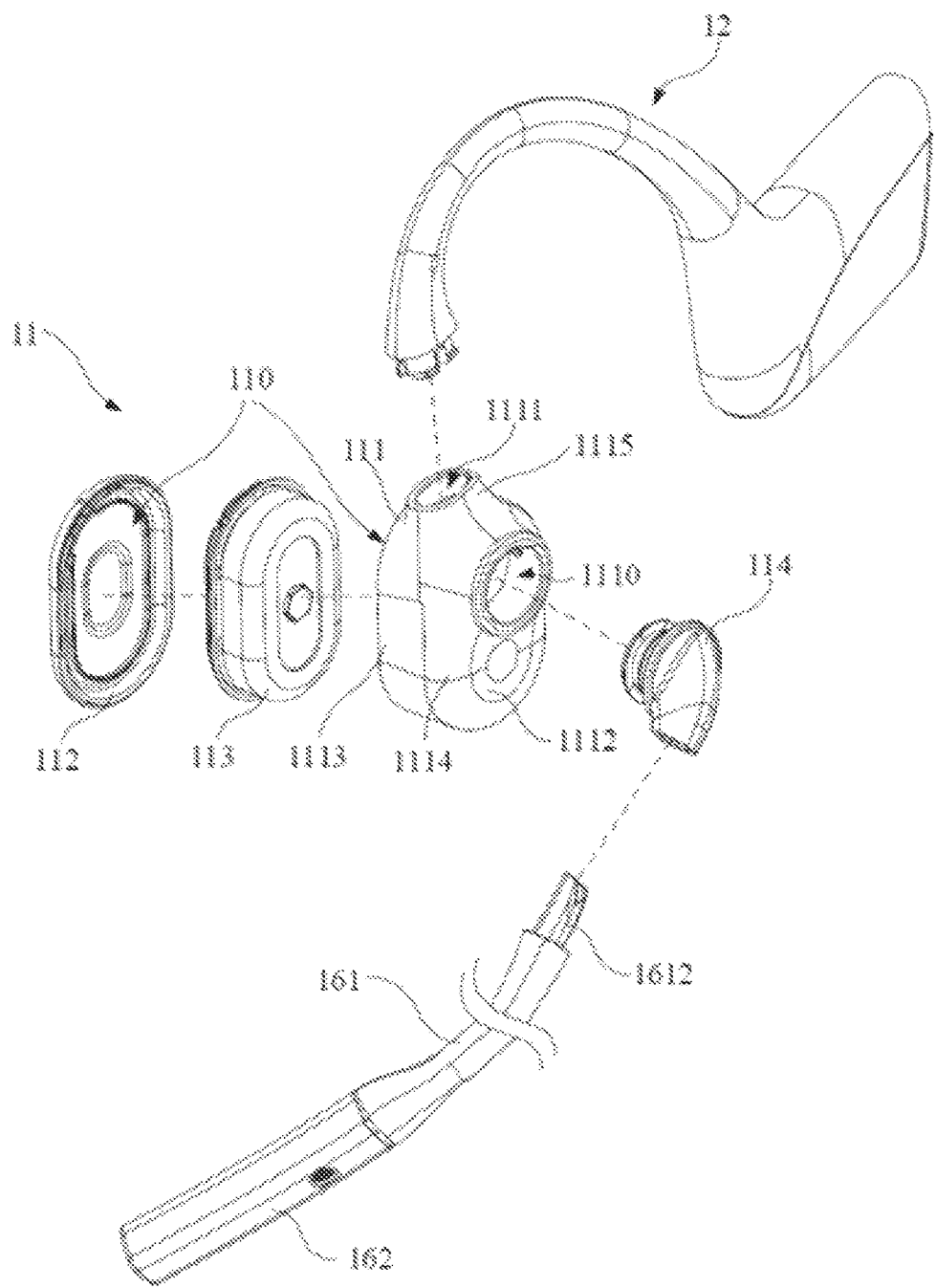
FIG. 6 is a schematic diagram illustrating an exemplary structural explosion of a speaker assembly in a bone conduction headset according to some embodiments of the present disclosure.

FIG. 6 is a schematic diagram illustrating an exemplary structural explosion of a speaker assembly in a bone conduction headset according to some embodiments of the present disclosure. In some embodiments, as shown in FIG. 6, the speaker assembly 11 may include a first speaker shell 111, a second speaker shell 112, a speaker 113, a rotating part 114, and a pressure holding part 115. The first speaker shell 111 and the second speaker shell 112 may be cooperatively connected to form a receiving space 110 for accommodating the speaker 113.

The first speaker shell 111 may be plug-fitted with one end of the elastic connecting rod 161. In order to facilitate the adjustment of the sound pickup position of the microphone assembly 16, it may be arranged that the microphone assembly 16 may rotate relative to the first speaker shell 111. In some embodiments, the speaker assembly 11 may include a rotating part 114. The first speaker shell 111 may be provided with a first through-hole 1110. The rotating part 114 may be rotatably inserted into the first through-hole 1110, and the connector 1612 may be plug-fitted with the rotating part 114 so that the microphone assembly 16 may rotate relative to the first speaker shell 111.

In some embodiments, the first speaker shell 111 may be provided with a second through-hole 1111 arranged at intervals with the first through-hole 1110. The second through-hole 1111 may be configured to plug-fitted with the ear hook assembly 12 so that the speaker assembly 11 and the ear hook assembly 12 may be connected. The first through-hole 1110 and the second through-hole 1111 may be both connected to the receiving space 110.

Specifically, the first speaker shell 111 may include an interconnected bottom wall 1112 and a side wall 1113. The side wall 1113 may surround and connect to the bottom wall 1112, and the second speaker shell 112 may be covered on the side of the side wall 1113 away from the bottom wall 1112, so as to form a receiving space 110 for accommodating the speaker 113. The first through-hole 1110 may be formed in the bottom wall 1112, and the second through-hole 1111 may be formed in the side wall 1113. The first through-hole 1110 may be formed on the side of the bottom wall 1112 adjacent to the second through-hole 1111 so that the first through-hole 1110 and the second through-hole 1111 may be adjacent. Specifically, the bottom wall 1112 may have a first convex portion 1114 protruding away from the receiving space 110, the first through-hole 1110 may be formed in the first convex portion 1114. The side wall 1113 may have a second convex portion 1115 protruding away from the receiving space 110, and the second through-hole 1111 may be formed in the second convex portion 1115. The convex direction of the first convex portion 1114 and the convex direction of the second convex portion 1115 may be perpendicular to each other, and the first convex portion 1114 and the second convex portion 1115 may be arched connected.

By setting the first convex portion 1114 provided on the bottom wall 1112 and the second convex portion 1115 provided on the side wall 1113, and the convex directions of the two convex portions may be perpendicular to each other and arched connected, which may enhance the structural strength and structural stability of the first speaker shell 111. In addition, the rotating part 114 may be embedded into the first through-hole 1110 of the first convex portion 1114, and the first convex portion 1114 may have a corresponding height so that the rotation of the microphone assembly 16 may not be interfered by the first speaker shell 111. The convex directions of the first convex portion 1114 and the second convex portion 1115 may be perpendicular to each other, which may also reduce the possibility of mutual interference between the ear hook assembly 12 and the microphone assembly 16.

In some embodiments, the sound pickup assembly 162 may be connected to other related assemblies (e.g., the battery assembly 14 or the control circuit assembly 15) on the bone conduction headset 1 through the corresponding wire group, so as to transmit the acquired audio signal to a related assembly for subsequent processing. The wire group of the microphone assembly 16 may pass through the microphone elastic coating 1613 of the elastic connecting rod 161 and be led out through the connector 1612. The wire group of the microphone assembly 16 may be threaded out through the connector 1612 and enter the first speaker shell 111. In some embodiments, the wire group of the stick microphone assembly 16 may be threaded into the first through-hole 1110 and into the second through-hole 1111 through the receiving space 110. The wire group of the microphone assembly 16 may further pass through the ear hook assembly 12 from the second through-hole 1111 into the accommodating space 120, and electrically connect the battery assembly 14 or the control circuit assembly 15.

In actual use, the microphone assembly 16 may rotate relative to the first speaker shell 111, which will make the wire group of the stick microphone assembly 16 move. In this way, the rotation of the microphone assembly 16 may be limited due to the improper movement of the wire group, and the wire group may also transmit the vibration of the speaker assembly 11 to the sound pickup assembly 162, thus affecting the effect of sound pickup of the sound pickup assembly 162, and may also affect the stability of the electrical connection. Therefore, the present disclosure proposes the following scheme to improve the above technical problem.

Figure 7:
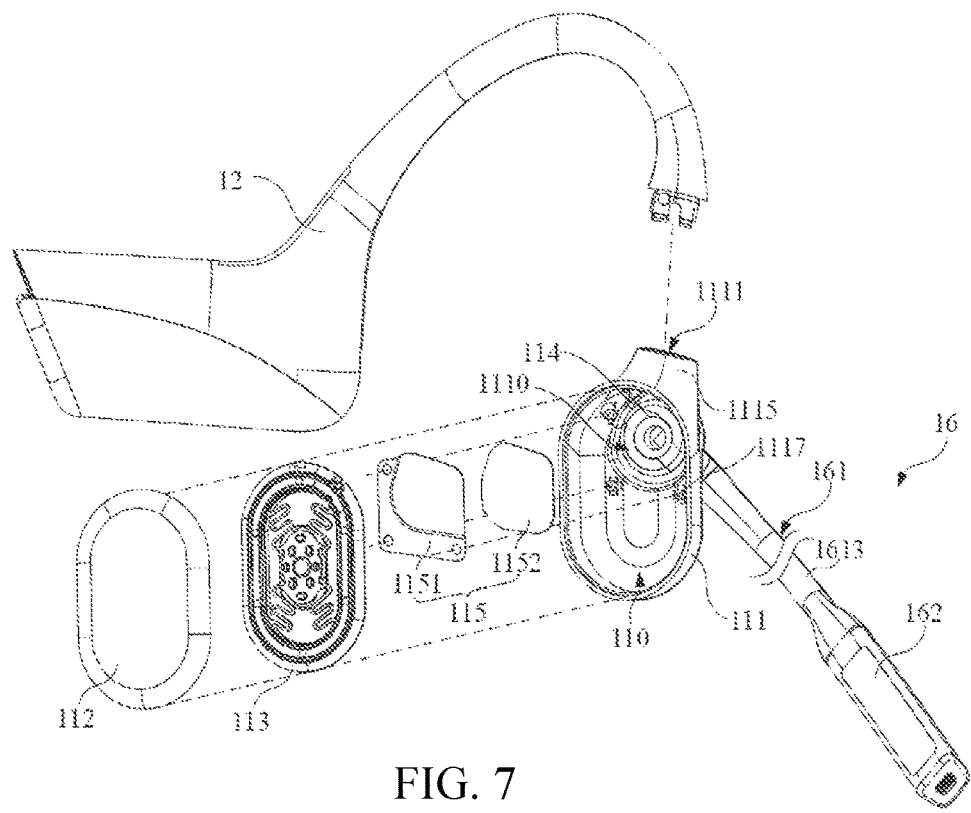
FIG. 7 is a schematic diagram illustrating an exemplary structural explosion of a speaker assembly in a bone conduction headset according to some embodiments of the present disclosure.

FIG. 7 is a schematic diagram illustrating an exemplary structural explosion of a speaker assembly in a bone conduction headset according to some embodiments of the present disclosure. In some embodiments, as shown in FIG. 7, the speaker assembly 11 may include a pressure holding part 115 for holding down the wire group of the microphone assembly 16. Specifically, the pressure holding part 115 may be arranged in the receiving space 110 and cover the first through-hole 1110 for holding down the wire group of the microphone assembly 16 which is led through the first through-hole 1110 to the second through-hole 1111. In this way, the movable space of the wire group of the microphone assembly 16 may be limited, the shaking or movement of the wire group may be reduced, and then the vibration generated by the vibration of the speaker assembly 11 and the vibration transmitted to the sound pickup assembly 162 may be reduced, thereby improving the effect of sound pickup of the sound pickup assembly 162 and also improving the electrical stability. In addition, the holding down of the pressure holding part 115 may also reduce the friction between the wire group and the first speaker shell 111, thereby protecting the wire group. The receiving space 110 may be formed after the first speaker shell 111 and the second speaker shell 112 are connected together. The receiving space 110 marked at the first speaker shell 111 in FIG. 7 is just an example. In addition, since the rotating part 114 may be inserted into the first through-hole 1110, and the first through-hole 1110 may be occupied by the rotating part 114, the first through-hole 1110 marked at the rotating part 114 in FIG. 7 is just for ease understanding and explanation.

In some embodiments, the pressure holding part 115 may include a hard cover plate 1151 and an elastomer 1152, and the hard cover plate 1151 and an elastomer 1152 may be arranged laminated. The hard cover plate 1151 may be farther away from the first through-hole 1110 than the elastomer 1152. The elastomer may be configured to contact the wire group of the microphone assembly 16. A hardness of the hard cover plate 1151 may be greater than a hardness of the elastomer 1152. The hard cover plate 1151 may contact the wire group by holding down the elastomer 1152. Since the hardness of the hard cover plate 1151 may be greater than the hardness of the elastomer 1152, the hard cover plate 1151 with greater hardness may ensure the rigidity of the holding down the wire group, while the elastomer 1152 with smaller hardness may improve the absorption of the movement or vibration of the wire group, thereby reducing the vibration of the wire group, and playing the role of buffer and protection.

Specifically, the first speaker shell 111 may be provided with a plurality of convex columns 1117 projecting into the receiving space 110 on the periphery of the first through-hole 1110. The plurality of convex columns 1117 may be arranged at intervals on the periphery of the first through-hole 1110. The hard cover plate 1151 may be fixed to a plurality of convex columns 1117, and the elastomer 1152 may be arranged between the plurality of convex columns 1117. For example, the count (or number) of convex columns 1117 may be three. The hard cover plate 1151 may be fixed by the plurality of convex columns 1117 arranged on the periphery of the first through-hole 1110, and then the elastomer 1152 may hold down the wire group of the microphone assembly 16, which may improve the stability of the hard cover plate 1151, and then improve the contact stability of the elastomer 1152 with the wire group.

Alternatively, the hard cover plate 1151 may be a steel sheet, and the elastomer 1152 may be a foam. The hard cover plate 1151 may also be other materials, such as plastic, ceramic, etc., and the elastomer 1152 may also be other materials, such as silica gel, fiber, etc.

Based on the above description, by setting the pressure holding part 115 to hold down the wire group of the microphone assembly 16, the vibrations of the wire group caused by the vibration of the speaker assembly 11 may be reduced, and the stability of the wire group of the microphone assembly 16 during rotation may be enhanced, and the wire group of the microphone assembly 16 may be protected. In addition, the rotation of the microphone assembly 16 may also require to have good stability, that is, the matching structure of the rotating part 114 and the first through-hole 1110 may play a greater role in the rotation stability of the microphone assembly 16.

Figure 8:
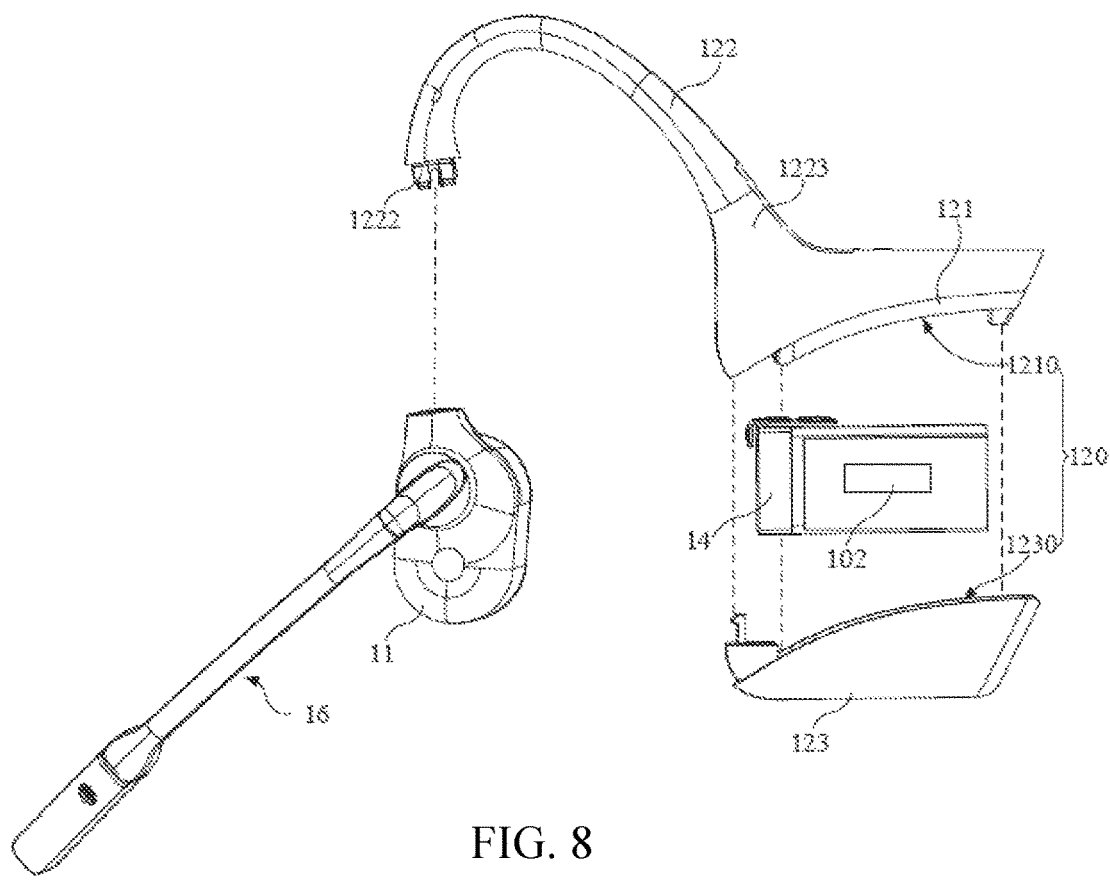
FIG. 8 is a schematic diagram illustrating an exemplary structural explosion of an ear hook assembly in a bone conduction headset according to some embodiments of the present disclosure.
Figure 9:
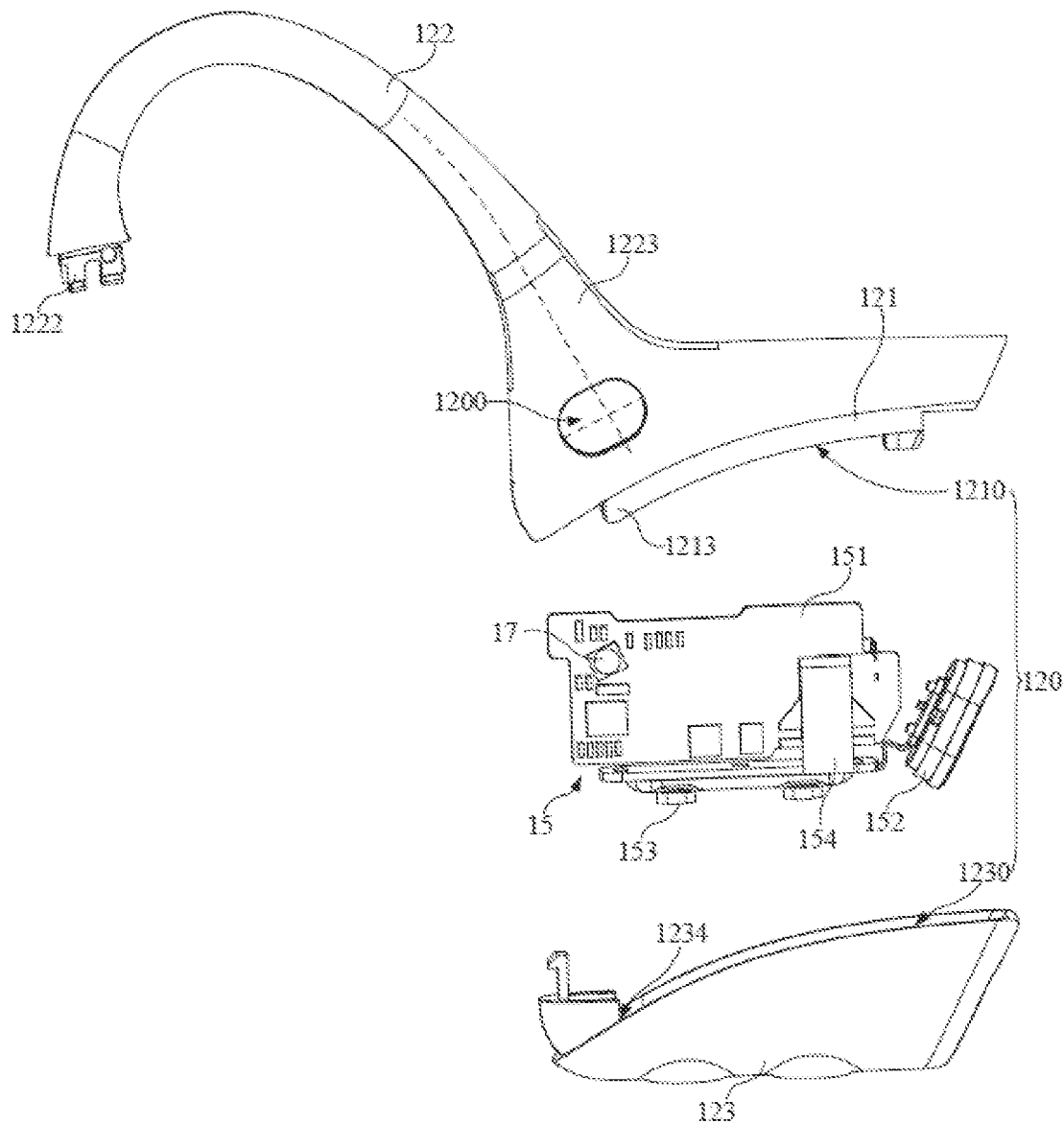
FIG. 9 is a schematic diagram illustrating an exemplary structural explosion of an ear hook assembly in the bone conduction headset according to some embodiments of the present disclosure.

FIG. 8 is a schematic diagram illustrating an exemplary structural explosion of an ear hook assembly in a bone conduction headset according to some embodiments of the present disclosure, and FIG. 9 is a schematic diagram illustrating another exemplary structural explosion of the ear hook assembly in a bone conduction headset according to some embodiments of the present disclosure.

In some embodiments, as shown in FIGS. 8 and 9, the ear hook assembly 12 may include a first ear hook shell 121, a connecting portion 122, and a second ear hook shell 123. One end of the connecting portion 122 may be connected to the first ear hook shell 121. The other end of the connecting portion 122 may be connected to the speaker 113. For example, the other end of the connecting portion 122 may be inserted into the second through-hole 1111 of the first speaker shell 111, so as to be plug-fitted with the speaker assembly 11. The first ear hook shell 121 and the second ear hook shell 123 may be cooperatively connected to form an accommodating space 120 for accommodating the battery assembly 14 or the control circuit assembly 15. In some embodiments, the accommodating space 120 of one of the ear hook assemblies 12 may be configured to accommodate the battery assembly 14 and/or the ear hook assembly 12 shown in FIG. 8. The accommodating space 120 of the other ear hook assembly 12 may be configured to accommodate the control circuit assembly 15 and/or the ear hook assembly 12 shown in FIG. 9.

In some embodiments, as shown in FIG. 8, the battery assembly 14 may include a battery shell (not marked) and an electric cell (not shown) arranged in the battery shell, and the electric cell may be configured to store electric power. The first NFC module 102 mentioned in the above embodiment of the headset communication system of the present disclosure may be attached to the battery assembly 14. For example, the first NFC module 102 may be attached to the battery shell, which may reduce the volume of the bone conduction headset 1 and reduce the electromagnetic interference or signal interference between the first NFC module 102 and the control circuit assembly 15.

In some embodiments, as shown in FIG. 9, the control circuit assembly 15 may include a circuit board 151, a power interface 152, a key 153, an antenna 154, and the like. The first Bluetooth module 101 shown in FIG. 2 may be integrated into the control circuit assembly 15. The control circuit assembly 15 may also be integrated with other circuits and elements. For example, the first Bluetooth module 101 may be integrated on the circuit board 151. The sensor assembly 17 may also be integrated on circuit board 151.

In some embodiments, as shown in FIG. 9, taking the sensor assembly 17 including an optical sensor as an example, the first ear hook shell 121 may form a window 1200 for transmitting an optical signal of the optical sensor. The window 1200 may be arranged adjacent to the connecting portion 122 so that the window 1200 may be close to the position of the ear root of user when the bone conduction headset 1 is worn. In addition, in some embodiments, the window may also be arranged at the rear hook assembly 13 or other positions. In some embodiments, if the sensor assembly 17 is an acceleration sensor, it may also be arranged in the accommodating space 120.

In some embodiments, the window 1200 may be arranged in a shape of a runway. It should be noted that in some other embodiments, according to the form of the sensor assembly 17, the shape and style of the window 1200 may also be adjusted according to the actual situation. For example, in order to prevent the sensor from being polluted or prevent moisture and dust from entering the bone conduction headset 1, when the sensor assembly 17 is an optical sensor, glass or other structures may be set on the window 1200. As another example, when the sensor assembly 17 is a contact sensor, the window 1200 may be set to other shapes according to the shape of a contact portion.

Alternatively, an extension line of a central axis of the connecting portion 122 may intersect with a long axis of the window 1200, as shown in FIG. 9. The window 1200 may be effectively close to a position close to the ear root of the user by setting the extension line of the central axis of the connecting portion 122 to intersect with the long axis of the window 1200, thus ensuring the sensitivity of the sensor assembly 7 and the effectiveness of detection. Specifically, the first ear hook shell 121 of the ear hook assembly 12 for accommodating the control circuit assembly 15 may form the window 1200.

The development trend of the bone conduction headset 1 will be toward portability and miniaturization. The ear hook assembly 12 may be configured to accommodate the battery assembly 14 or the control circuit assembly 15 and the related wiring, which often has a large volume in the bone conduction headset 1. The design of the relevant buckle and snap structure in the ear hook assembly 12 may affect the entire volume of the ear hook assembly 12. In order to reduce the volume of the ear hook assembly 12, following shell structures of the ear hook assembly may be provided.

In some embodiments, the bone conduction headset 1 may include two speaker assemblies 11 and two ear hook assemblies 12. Each speaker assembly 11 and two ear hook assemblies 12 may separately form the left ear and the right ear of the headset. Specifically, the battery assembly 14 and the control circuit assembly 15 may be arranged in the accommodating space 120 formed by the two ear hook assemblies, respectively. In some embodiments, as described in FIG. 2, the two first Bluetooth modules 101 may be arranged in the two accommodating spaces 120 and connected through TWS, respectively. It should be noted that in the above embodiment, the ear hook assembly may be configured to maintain the fixation with the ear of the user, so the ear hook assembly 12 may not be necessary. In addition, the bone conduction headset 1 may also include the ear hook assembly 12. However, since the two first Bluetooth modules 101 may be connected through TWS, there is no need to route wires in the ear hook assembly.

Figure 10:
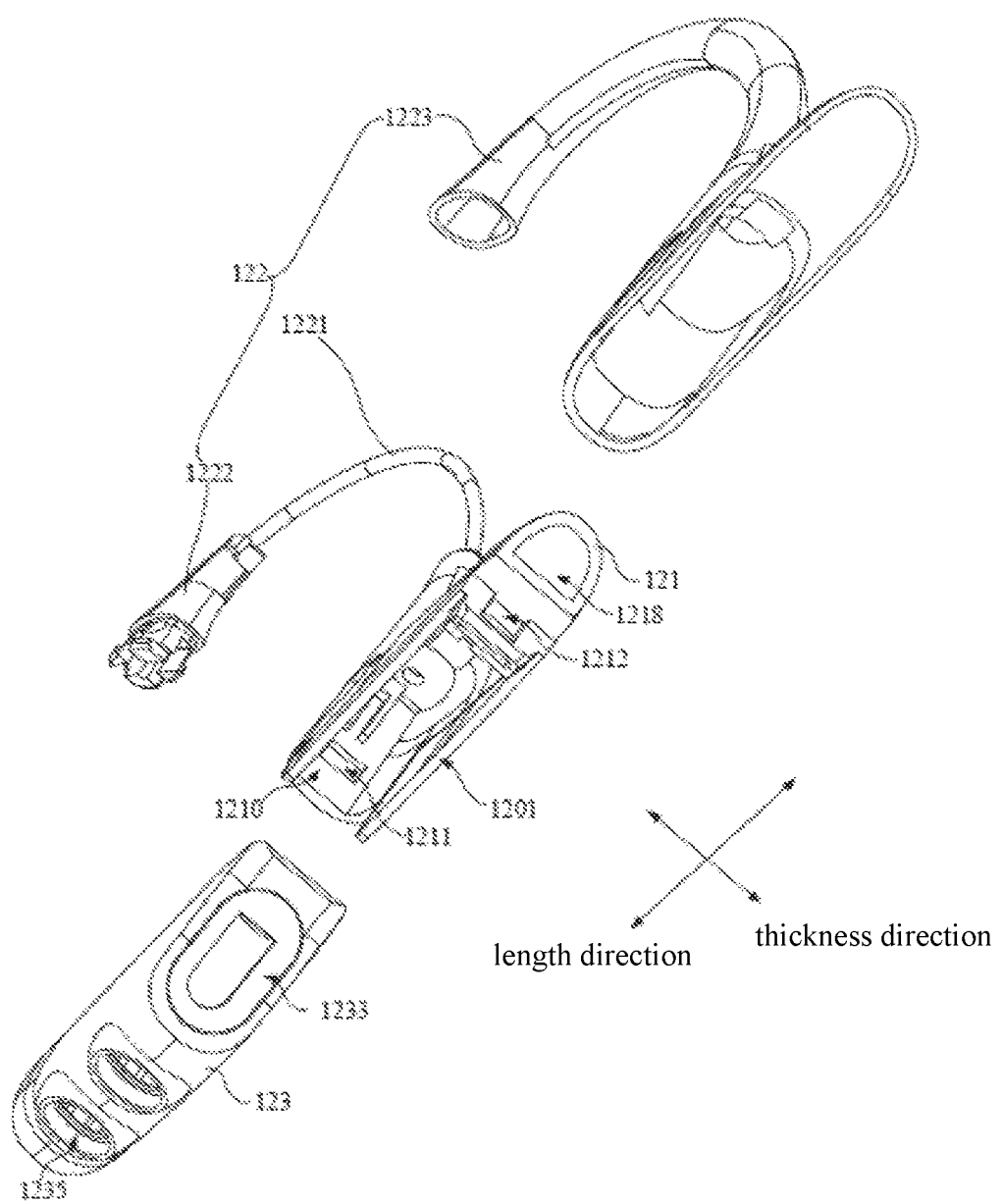
FIG. 10 is a schematic diagram illustrating exemplary structures of a first ear hook shell and a second ear hook shell in a bone conduction headset according to some embodiments of the present disclosure.
Figure 11:
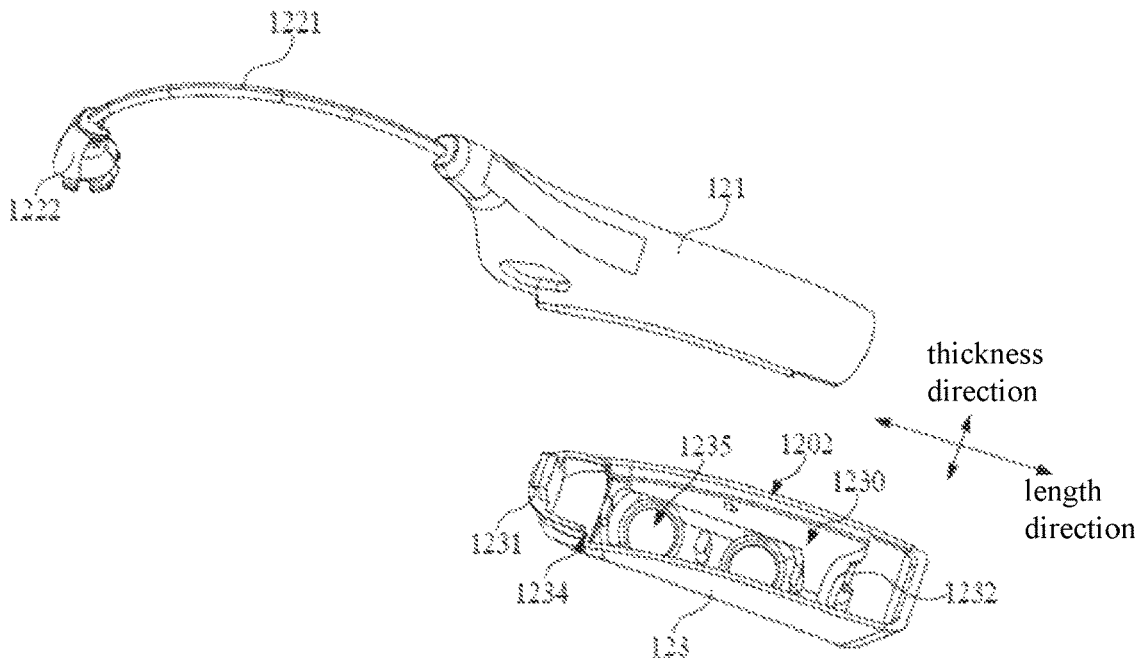
FIG. 11 is a schematic diagram illustrating exemplary structures of a first ear hook shell and a second ear hook shell in a bone conduction headset according to some embodiments of the present disclosure.
Figure 12:
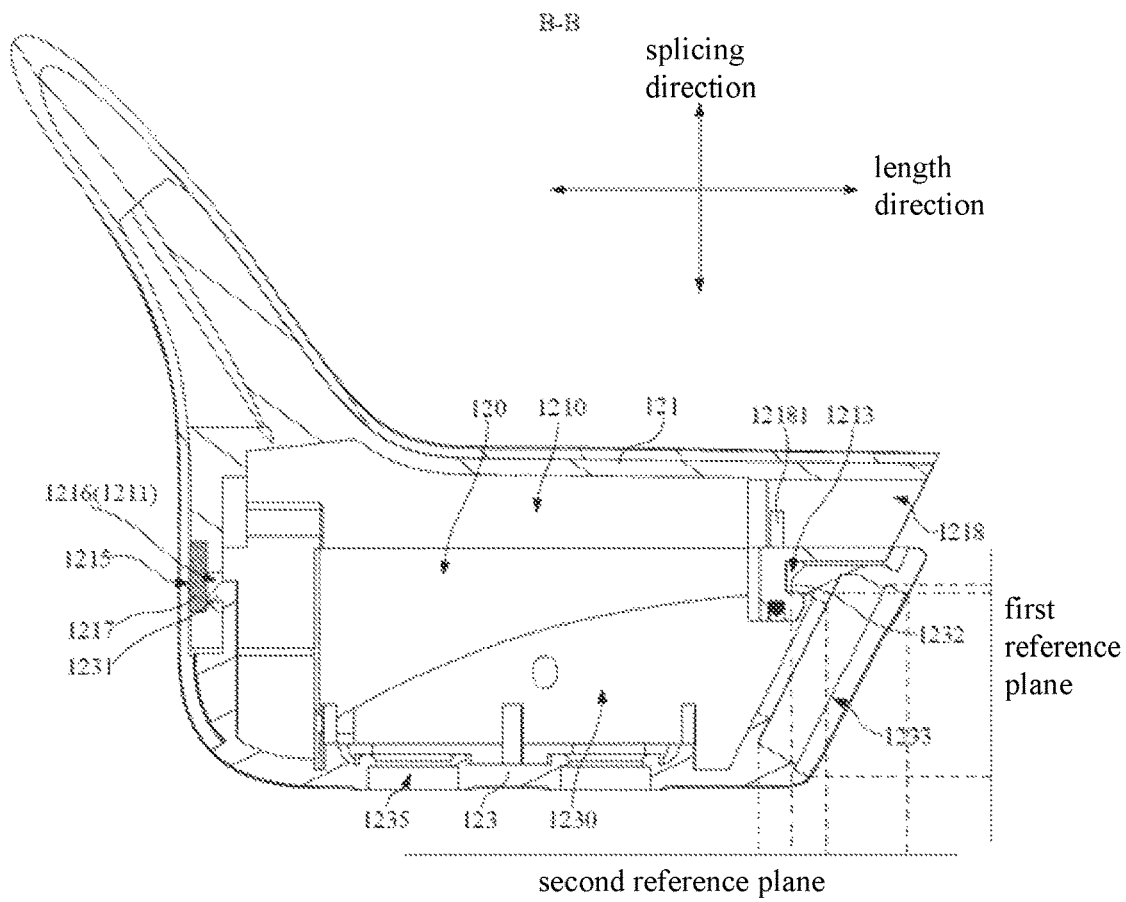
FIG. 12 is a schematic diagram illustrating a cross-sectional structure of an ear hook assembly with B-B as a section line in FIG. 3 according to some embodiments of the present disclosure.

FIG. 10 is a schematic diagram illustrating exemplary structures of a first ear hook shell and a second ear hook shell in a bone conduction headset according to some embodiments of the present disclosure. FIG. 11 is a schematic diagram illustrating another exemplary structures of a first ear hook shell and a second ear hook shell in a bone conduction headset according to some embodiments of the present disclosure. FIG. 12 is a schematic diagram illustrating a cross-structural diagram with B-B as a section line in FIG. 3.

In some embodiments, as shown in FIG. 10, the first ear hook shell 121 may form a first clamp slot 1211 and a second champ slot 1212 arranged at intervals, the second ear hook shell 123 may form a first clamp block 1231 and a second clamp block 1232 which may be arranged at intervals, the first clamp slot 1211 and the first clamp block 1231 may be clamped and matched, and the second clamp slot 1212 and the second clamp block 1232 may be clamped and matched, Further, the first ear hook shell 121 and the second ear hook shell 123 may be clamped and matched.

In some embodiments, the accommodating space 120 may have a length direction and a thickness direction perpendicular to each other. For the following contents of this embodiment, the length direction may refer to a length direction of the accommodating space 120, and the thickness direction may refer to a thickness direction of the accommodating space 120.

As shown in FIG. 10 and FIG. 11, the first ear hook shell 121 and the second ear hook shell 123 may be spliced with each other along a splicing direction. The splicing direction may be perpendicular to the length direction and the thickness direction, thereby forming an accommodating space 120. For example, the first ear hook shell 121 may have a first sub-accommodating space 1210, and the second ear hook shell 123 may have a second sub-accommodating space 1230. After the first ear hook shell 121 and the second ear hook shell 123 are spliced, the first sub-accommodating space 1210 and the second sub-accommodating space 1230 may be combined into an accommodating space 120.

In some embodiments, the first ear hook shell 121 may form a first clamp slot 1211 and a second clamp slot 1212 with a same opening direction along the length direction and arranged at intervals. That is, the opening directions of the first clamp slot 1211 and the second clamp slot 1212 may be the same. The second ear hook shell 123 may be protruded along the length direction and may be provided with a first clamp block 1231 and a second clamp block 1232 with the same extension direction. That is, the first clamp block 1231 and the second clamp block 1232 may be arranged at intervals in the length direction, and their projection directions may be the same, and then the two clamp blacks are facing the same direction so that the first clamp block 1231 and the second clamp block 1232 may be embedded in the first clamp slot 1211 and the second clamp slot 1212 respectively along the same direction.

In some embodiments, as shown in FIG. 12, the first clamp block 1231 may be embedded in the first clamp slot 1211, and the second clamp block 1232 may be embedded in the second clamp slot 1212, so as to limit the relative movements of the first ear hook shell 121 and the second ear hook shell 123 in the splicing direction and thickness direction.

In some embodiments, the splicing edge 1201 of the first ear hook shell 121 and the splicing edge 1202 of the second ear hook shell 123 may fit with each other, so as to limit the relative movement of the first ear hook shell 121 and the second ear hook shell 123 in the length direction. In some embodiments, a splicing of the first ear hook shell 121 and the second ear hook shell 123 may refer to the splicing edge 1201 of the first ear hook shell 121 and the splicing edge 1202 of the second ear hook shell 123 are roughly in contact and connected. The splicing edge 1201 of the first ear hook shell 121 may refer to the edge of the first ear hook shell 121 toward the second ear hook shell 123 for splicing with the second ear hook shell 123, as shown in FIG. 10. Similarly, the splicing edge 1202 of the second ear hook shell 123 may refer to the edge of the second ear hook shell 123 toward the first ear hook shell 121 for splicing with the first ear hook shell 121, as shown in FIG. 11. For example, the shape of the splicing edge 1201 of the first ear hook shell 121 and the shape of the splicing edge 1202 of the second ear hook shell 123 may adapt to each other, and may match or complement each other to form a stable matching structure, which may limit the relative movements of the first ear hook shell 121 and the second ear hook shell 123 in the length direction.

In some embodiments, if the first clamp block 1231 and the second clamp block 1232 extend in opposite directions, the first clamp block 1231 and the second clamp block 1232 may protrude in opposite directions, which may inevitably increase additional space occupied by the first clamp block 1231 and the second clamp block 1232. In order to enable the first clamp block 1231 and the second clamp block 1232 being embedded into the first clamp slot 1211 and the second clamp slot 1212, respectively, the first clamp slot 1211 and the second clamp slot 1212 may be required to increase the distance in the length direction, so as to cover the first clamp block 1231 and the second clamp block 1232. However, in some embodiments, by setting the first clamp slot 1211 and the second clamp slot 1212 with the same opening direction and the first clamp block 1231 and the second clamp block 1232 with the same extension direction, the matching directions of the first clamp block 1231 with the first clamp slot 1211 and the second clamp block 1232 with the second clamp slot 1212 may by the same. Since the extension direction of the first clamp block 1231 and the second clamp block 1232 may be the same, the additional occupied volume of the first clamp block 1231 and the second clamp block 1232 may be reduced, and then the occupied volume of the first clamp block 1231 and the second clamp block 1232 matched with the first clamp slot 1211 and the second clamp slot 1212 may be reduced. In this way, the volume of the ear hook assembly 12 may be effectively reduced. In addition, by using the splicing edge 1201 of the first ear hook shell 121 and the splicing edge 1202 of the second ear hook housing 123 to fit each other, it is unnecessary to set additional buckles, protrusions and other structures, thereby making the structure of the ear hook assembly 12 more compact and may also reducing the volume of the ear hook assembly 12. Moreover, the displacement in the splicing direction and thickness direction may be limited by the cooperation of the first clamp block 1231 and the second clamp block 1232 with the first clamp slot 1211 and the second clamp slot 1212, respectively, and the displacement in the length direction may be limited by the combination of the splicing edge 1201 and splicing edge 1202, which may make the splicing of the first ear hook shell 121 and the second ear hook shell 123 more stable and more reliable.

In some embodiments, as shown in FIG. 10, the first clamp slot 1211 and the second clamp slot 1212 may be located on both sides of the first ear hook shell 121 along the length direction, respectively. The opening direction of the first clamp slot 1211 faces the accommodating space 120, and the opening direction of the second clamp slot 1212 deviates from the accommodating space 120. That is, the opening direction of the first clamp slot 1211 may be toward the first sub-accommodating space 1210, and the opening direction of the second clamp slot 1212 may be away from the first sub-accommodating space 1210. Alternatively, the first clamp slot 1211 may be arranged on the side of the first ear hook shell 121 close to the connecting portion 122, and the second clamp slot 1212 may be arranged on the side of the first ear hook shell 121 away from the connecting portion 122.

In some embodiments, as shown in FIG. 11, the first clamp block 1231 and the second clamp block 1232 may be located on both sides of the second ear hook shell 123 along the length direction, the extension direction of the first clamp block 1231 may be away from the first clamp slot 1211, and the extension direction of the second clamp block 1232 may be toward the first clamp slot 1211. That is, the extension direction of the first clamp block 1231 may be away from the second sub-accommodating space 1230, and the extension direction of the second clamp block 1232 may be toward the second sub-accommodating space 1230. Accordingly, the first clamp block 1231 may be arranged on the side of the second ear hook shell 123 close to the connecting portion 122, and the second clamp block 1232 may be arranged on the side of the second ear hook shell 123 away from the connecting portion 122. Since the second clamp block 1232 protrudes and extends into the accommodating space 120, compared with the protruding and extending outside the accommodating space 120, it does not require to occupy additional space, which may save the corresponding space. The second clamp slot 1212 may be located in front of the extension direction of the second clamp block 1232 when matching the second clamp slot 1212 and the second clamp block 1232, and the second clamp slot 1212 and the second clamp block 1232 may be embedded and matched, which may also reduce the volume of the ear hook assembly 12.

In some embodiments, the splicing edge 1201 of the first ear hook shell 121 may be provided with a first stop portion 1213, and the splicing edge 1202 of the second ear hook shell 123 may be provided with a second stop portion 1234. The first stop portion 1213 and the second stop portion 1234 may fit with each other to limit the relative movements of the first ear hook shell 121 and the second ear hook shell 123 in the length direction. For example, the first stop portion 1213 may be an opening portion formed by the splicing edge 1201 of the first ear hook shell 121, and the second stop portion 1234 may be a projection portion formed by the splicing edge 1202 of the second ear hook shell 123. The shape of the opening portion and the projection portion adapt to each other so that the splicing edge 1201 of the first ear hook shell 121 and the splicing edge 1202 of the second ear hook shell 123 may complement each other, so as to limit the relative movements of the first ear hook shell 121 and the second ear hook shell 123 in the length direction.

Since the opening direction of the first clamp slot 1211 faces the accommodating space 120, if the first clamp slot 1211 is directly formed in the first sub-accommodating space 1210, a demoulding direction of forming the first sub-accommodating space 1210 and a demoulding direction of forming the first clamp slot 1211 may interfere with each other in the process of forming the first sub-accommodating space 1210 and the first clamp slot 1211 with corresponding molds. Since the demoulding direction of the first clamp slot 1211 may be within the first sub-accommodating space 1210, it may also conflict with the demoulding direction of other structures, which brings great difficulties to production.

Figure 13:
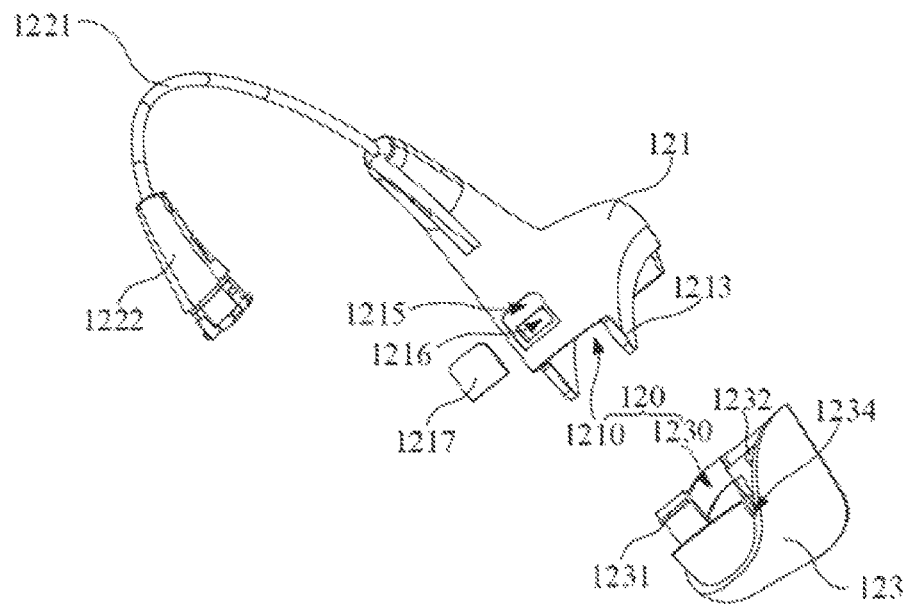
FIG. 13 is a schematic diagram illustrating exemplary structures of a first ear hook shell and a second ear hook shell in a bone conduction headset according to some embodiments of the present disclosure.

FIG. 13 is a schematic diagram illustrating another exemplary structures of a first ear hook shell and a second ear hook shell in a bone conduction headset according to some embodiments of the present disclosure. In some embodiments, as shown in FIG. 13, the first ear hook shell 121 may be provided with an outer hole section 1215 and an inner hole section 1216 communicating with each other. A direction of communicating is from the outside of the accommodating space 120 to the inside of the accommodating space 120. That is, the opening direction of the outer hole section 1215 may face away from the accommodating space 120, the opening direction of the inner hole section 1216 may face toward the accommodating space 120, and the outer hole section 1215 and the inner hole section 1216 may be connected and intercommunicated. The outer hole section 1215 may be filled with a filler 1217. The filler 1217 may be, for example, a rubber part, a hard rubber. After the outer hole section 1215 is filled and blocked, the inner hole section 1216 may be used as the first clamp slot 1211. The opening direction of the inner hole section 1216 may face the accommodating space 120 and may be matched with the first clamp block 1231.

In the actual manufacturing process, the outer hole section 1215 and the inner hole section 1216 may be formed successively from the outside of the first ear hook shell 121 to the inside of the first ear hook shell 121. The demoulding direction may be not in the first sub-accommodating space 1210, but be outside the first ear hook shell 121. Then, the outer hole section 1215 may be filled with filler 1217, so that the remaining inner hole section 1216 may be used as the first clamp slot 1211. In this way, the manufacturing difficulty and complexity may be effectively reduced and the cost may be saved.

In some embodiments, the cross-sectional area of the outer hole section 1215 perpendicular to the communication direction of the outer hole section 1215 and the inner hole section 1216 may be greater than the cross-sectional area of the inner hole section 1216 perpendicular to the communication direction of the outer hole section 1215 and the inner hole section 1216. Since the corresponding cross-sectional area of the outer hole section 1215 may be larger than the corresponding cross-sectional area of the inner hole section 1216, it may be convenient to fill the filler 1217 in the outer hole section 1215, which may have a good plugging effect and form the first clamp slot 1211 quickly.

In some embodiments, as shown in FIGS. 10 to 12, a power jack 1233 may be provided in a portion of the second ear hook shell 123 away from the connecting portion 122. The power jack 1233 may be connected to the accommodating space 120, and the power jack 1233 may be configured to accommodate the power interface 152. For example, the second ear hook shell 123 may also have a shell bottom and a shell side, and the shell side may surround and connect the shell bottom to form a second sub accommodating space 1230. The edge of the shell side away from the shell bottom may be the splicing edge 1202 for splicing with the first ear hook shell 121. The power jack 1233 may be arranged at the shell side to connect with the second sub-accommodating space 1230, that is, to the power jack 1233 may connect with the accommodating space 120.

In some embodiments, as shown in FIG. 12, the second clamp block 1232 may be arranged adjacent to the power jack 1233. That is, the second clamp block 1232 may protrude from a portion of the second ear hook shell 123 away from the connecting portion 122 and face into the accommodating space 120. In some embodiments, the second clamp block 1232 may be closer to the accommodating space 120 than the power jack 1233. In other words, the second clamp block 1232 may be closer to the connecting portion 122 than the power jack 1233.

In some embodiments, the projections of the second clamp block 1232 and the power jack 1233 on a first reference plane may overlap each other, and the first reference plane may be perpendicular to the length direction. In some embodiments, overlapping each other may include partial overlapping (i.e., the overlapping part is a part of the projection of the second clamp block 1232, and also a part of the projection of the power jack 1233), and also includes full overlapping (i.e., the projection of the second clamp block 1232 completely falls into the projection of the power jack 1233). Alternatively, the plane perpendicular to the length direction may be taken as the first reference plane, and the projection of the second clamp block 1232 on the first reference plane may be located within the projection of the power jack 1233 on the first reference plane, that is, the projection ranges of the two may be all overlapped. By setting the positions of the second clamp block 1232 and the power jack 1233 as set forth above, the structure of the second ear hook shell 123 may be made compact and the volume of the ear hook assembly 12 may be reduced without affecting the installation of the power interface 152.

In some embodiments, the projections of the second clamp block 1232 and the power jack 1233 on a second reference plane may overlap each other, and the second reference plane may be perpendicular to the splicing direction. The overlap may also include partial overlap and full overlap. Alternatively, the plane perpendicular to the splicing direction may be taken as the second reference plane, and the projection of the second clamp block 1232 on the second reference plane may be also located within the projection of the power jack 1233 on the second reference plane. That is, the projection ranges of the two may be all overlapped. In this way, the second clamp block 1232 and the power jack 1233 may be compactly arranged in both the splicing direction and the length direction, and the space occupied by the power jack 1233 and the second clamp block 1232 may be greatly saved, so as to improve the structural compactness of the ear hook assembly 12.

In addition, the use of the bone conduction headset 1 in industrial and other manufacturing fields has a great requirement for the operation experience of the bone conduction headset 1. Opening the power jack 1233 in the part of the second ear hook shell 123 away from the connecting portion 122 may improve the operation experience of the bone conduction headset 1. The reasons are as follows:

The bone conduction headset 1 generally has a volume key, etc. According to the existing conventional means, a keyhole 1235 corresponding to the key 153 and the power jack 1233 may be generally set at the shell bottom of the second ear hook shell 123. That is, the partial shell of the second ear hook shell 123 may be away from the first ear hook shell 121. Due to the limited area at the shell bottom, the keyhole 1235 and the power jack 1233 may be relatively compact, and the keyhole 1235 and the power jack 1233 do not occupy as much space as possible. In industrial and other manufacturing fields, the user may wear work clothes or gloves. The keyholes 1235 may be small and arranged too closely, which may reduce the user's control experience and easily lead to misoperation. However, in some embodiments, the power jack 1233 may not be set on the bottom of the shell, but be set on the side of the shell, so the size of the keyholes 1235 may be designed to be large, and the arrangement between them may be relatively loose, which may facilitate the user's operation and reduce the occurrence of misoperation.

In addition, based on the above design of the power jack 1233, if the second clamp block 1232 may be set at a position where the second ear hook shell 123 is adjacent to the power jack 1233 and faces the top of the first ear hook shell 121 (as shown in FIG. 11, the platform area connecting the second clamp block 1232, that is, the second clamp block 1232 may be regarded as extending from the platform area to the second sub-accommodating space 1230), the space of the connection jack 1218 of the first ear hook shell 121 may be squeezed. Further, it may affect the plug-fitted between the ear hook assembly 12 and the rear hook assembly 13. The second clamp block 1232 may be required to occupy additional space, which may make the splicing of the first ear hook shell 121 and the second ear hook shell 123 occupy a large space in the splicing direction and may be not compact enough. Therefore, by setting the power jack 1233 at the bottom of the second ear hook shell 123, and the above projection relationship setting the structural relationship between the second clamp block 1232 and the power jack 1233, the structure of the second ear hook shell 123 may be compact in the splicing direction, and the second clamp block 1232 extends towards the accommodating space 120, so it does not require to occupy additional space, and the volume of the ear hook shell 12 may be miniaturized.

Based on the above detailed description, the stable splicing structure between the first ear hook shell 121 and the second ear hook shell 123 may protect the battery assembly 14 and the control circuit assembly 15 in the accommodating space 120. Of course, in order to reduce the failure rate of the bone conduction headset 1, it is necessary to ensure not only the stability of the structure but also the stability of the electrical connection. The wire group in the bone conduction headset 1 may be wired between the speaker assembly 11 and the ear hook assembly 12. The stability of the wiring may be related to the reliability of the bone conduction assembly. In order to improve the reliability of wiring, the ear hook assembly 12 may be provided with a corresponding wire clamping structure, so as to ensure the stability of wiring when the wire group passes through the ear hook assembly 12.

In some embodiments, the connecting portion 122 may include an ear hook elastic wire 1221 and a joint portion 1222 connected to one end of the ear hook elastic wire 1221. In order to protect the ear hook elastic wire 1221, the connecting portion 122 may also include an ear hook elastic coating 1223 (as shown in FIG. 10) at least covering the outer circumference of the ear hook elastic wire 1221. Of course, the ear hook elastic wire 1221 may further cover the first ear hook shell 121. The joint portion 1222 may be used for plug-fit with the speaker assembly 11. The other end of the ear hook elastic wire 1221 may be connected to the first ear hook shell 121.

Figure 14:
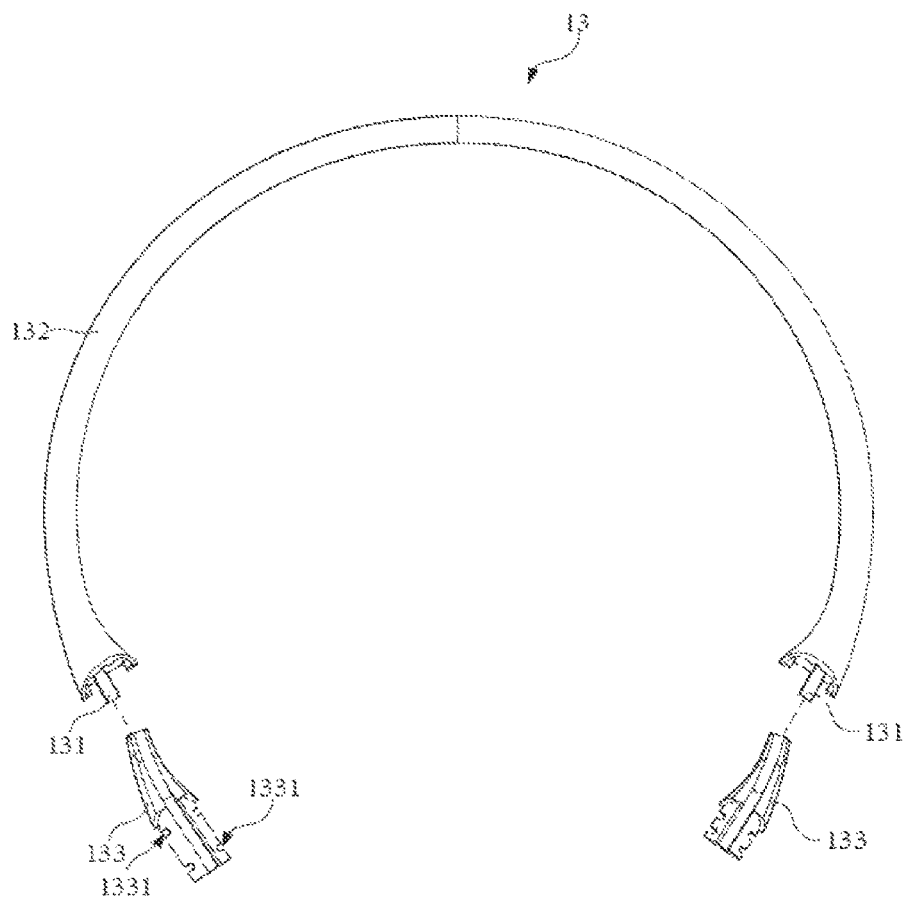
FIG. 14 is a schematic diagram illustrating an exemplary structural explosion of a rear hook assembly in a bone conduction headset according to some embodiments of the present disclosure.
Figure 15:
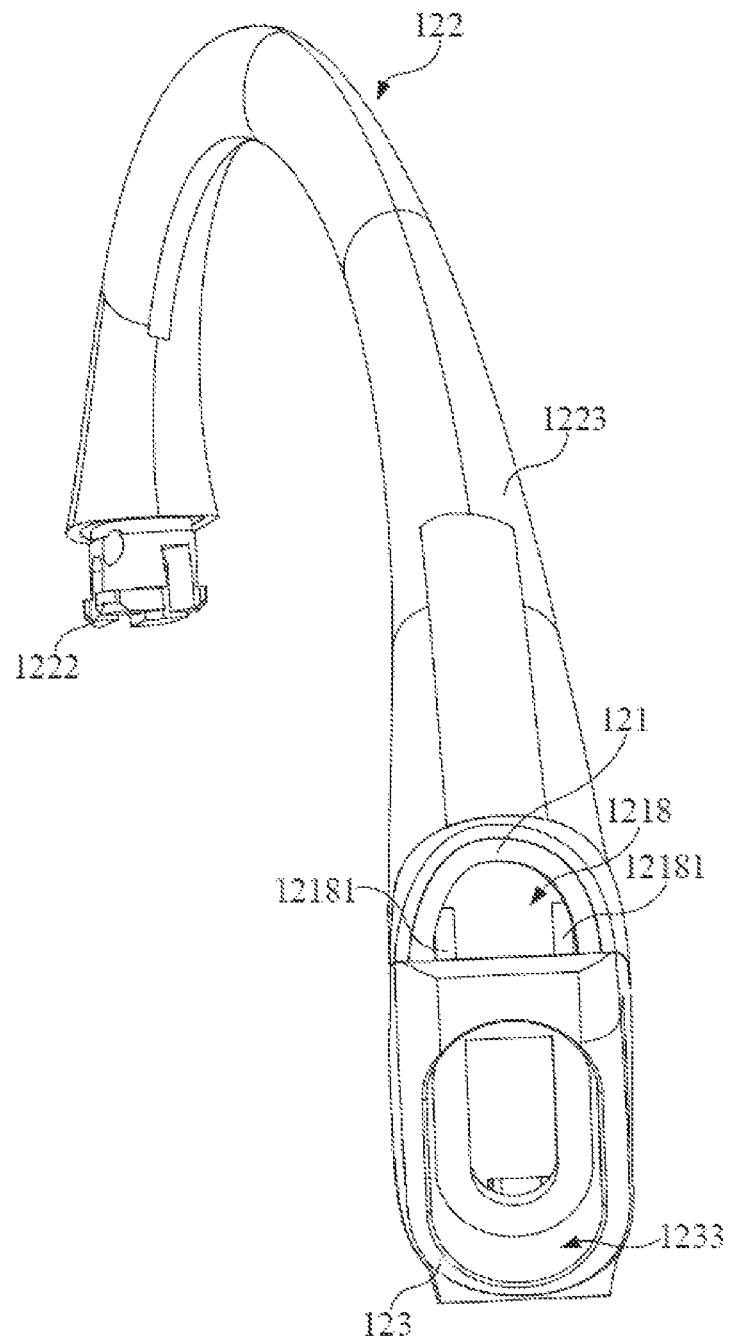
FIG. 15 is a schematic diagram illustrating an exemplary structure of an ear hook assembly in a bone conduction headset according to some embodiments of the present disclosure.

FIG. 14 is a schematic diagram illustrating an exemplary structural explosion of a rear hook assembly in the bone conduction headset according to some embodiments of the present disclosure, and FIG. 15 is a schematic diagram illustrating an exemplary structure of an ear hook assembly in the bone conduction headset according to some embodiments of the present disclosure.

In some embodiments, as shown in FIG. 14, the rear hook assembly 13 may include a rear hook elastic wire 131, a rear hook elastic coating 132 coated on the rear hook elastic wire 131, and an insertion portion 133 arranged at both ends of the rear hook elastic wire 131. The rear hook elastic coating 132 may also cover at least a portion of the insertion portion 133.

In some embodiments, the insertion portion 133 may be used for plug-fitting with the ear hook assembly 12. Specifically, a side of the first ear hook shell 121 away from the connecting portion 122 may be provided with a connection jack 1218 for communicating with the accommodating space 120. The connection jack 1218 may be adjacent to the second clamp slot 1212. The insertion portion 133 may be plug-fitted with the connection jack 1218. At least one inserting portion 133 may be provided with two groups of slots 1331 arranged at intervals in its length direction. That is, at least one insertion portion 133 may be provided with two groups of slots 1331 arranged at intervals in the length direction of the insertion portion 133, and each group of slots 1331 may include at least one slot 1331. The rear hook elastic wire 131 may be inserted into the insertion portion 133 through one end of the insertion portion 133. One group of slots 1331 may be adjacent to the insertion portion 133, and the other group of slots 1331 may be away from one end of the insertion portion 133.

In some embodiments, the insertion portion 133 may be successively provided with the above two groups of slots 1331 in a direction, and the direction may be from one end of the insertion portion 133 to the other end of the insertion portion 133. A slot 1331 near one end of the insertion portion 133 may be used for mold positioning. The slot 1331 at one end away from the insertion portion 133 may be used for snap-fitting with the first ear hook shell 121.

For example, the two groups of slots 1331 may be divided into a first group of slots 1331 and a second group of slots 1331. The first group of slots 1331 may be away from one end of the insertion portion 133 and may be used for snap-fit with the ear hook assembly 12. As shown in FIGS. 14 and 18, the first ear hook shell 121 may be protruding provided with a clamping portion 12181. For example, the clamping portion 12181 may be protruded from the connection jack 1218 of the first ear hook shell 121. The insertion portion 133 may be inserted into the connection jack 1218 and the clamping portion 12181 may be embedded into the first group of slots 1331, thereby restricting the relative movements of the ear hook assembly 12 and the rear hook assembly 13.

The second slot 1331 may be close to one end of the insertion portion 133 and may be used for mold positioning. That is, the second group of slots 1331 may be configured to cooperate with the corresponding protruding structure on the mold, so as to accurately fix the insertion portion 133 at a certain position, so as to carry out other processes and improve the yield. For example, the second group of slots 1331 may be configured to position the insertion portion 133 and the rear hook elastic wire 131, and then the rear hook elastic coating 132 may be formed by injection molding.

Alternatively, the slot 1331 may be provided by extending to the edges of the insertion portion 133 on both sides of the axis in the direction of the central axis. Each group of slots 1331 may include two slots 1331, and the two slots 1331 of each group may be arranged opposite to each other.

The basic concepts have been described above. Obviously, for those skilled in the art, the above detailed disclosure is only an example, which does not constitute a limitation of the present disclosure. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of this disclosure.

Moreover, certain terminology has been used to describe embodiments of the present disclosure For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. In addition, some features, structures, or characteristics of one or more embodiments in the present disclosure may be appropriately combined.

Similarly, it should be appreciated that in the foregoing description of embodiments of the present disclosure, various features are sometimes grouped together in a single embodiment, figure, or description thereof for the purpose of streamlining the disclosure and aiding in the understanding of one or more of the various embodiments. However, this method of disclosure does not imply that the subject matter of the description requires more features than those that are recited in the claims. Rather, claimed subject matter may lie in less than all features of a single foregoing disclosed embodiment.

In some embodiments, numbers describing the number of ingredients and attributes are used. It should be understood that such numbers are used for the description of the embodiments, although the numerical fields and parameters used to confirm the breadth of the range in some embodiments of the present disclosure are approximate values, in specific embodiments, the setting of such values is as accurate as possible within the feasible range.

Each of the patents, patent applications, publications of patent applications, and other material, such as articles, books, specifications, publications, documents, things, and/or the like, referenced herein is hereby incorporated herein by this reference in its entirety for all purposes, History application documents that are inconsistent or conflictive with the contents of the present specification are excluded, as well as documents (currently or subsequently appended to the present specification) limiting the broadest scope of the claims of the present specification. It should be noted that in case of any inconsistency or conflict between the description, definitions, and/or usage of terms in the supplementary materials of the present disclosure and the contents described in the present disclosure, the description, definitions, and/or usage of terms in the present disclosure shall prevail.

Finally, it should be understood that the embodiments described in this specification are intended to illustrate the principles of the embodiments of the present specification. Other deformations may also belong to the scope of this specification. Therefore, as an example rather than a limitation, the alternative configuration of the embodiments of this specification can be regarded as consistent with the teachings of this specification. Accordingly, the embodiments of this specification are not limited to those explicitly introduced and described in this specification.

What is claimed is:

1. A headset communication system, comprising:
    a bone conduction headset, comprising a first Bluetooth module and a sensor assembly;
    an intercom device, comprising a first external interface;
    an external communication module, comprising a second external interface and a second Bluetooth module, wherein the external communication module is detachably arranged on the intercom device and is coupled to the intercom device through the first external interface and the second external interface, wherein
    the bone conduction headset and the intercom device are Bluetooth paired through the first Bluetooth module and the second Bluetooth module to establish a Bluetooth connection, wherein the sensor assembly is configured to detect whether the bone conduction headset is worn by a user;
    when the bone conducting headset is worn, the sensor assembly is configured to control the bone conduction headset to pick up sound and/or play voice; and
    when the bone conducting headset is not worn, the sensor assembly is configured to control the intercom device to pick up sound and/or play voice.

2. The headset communication system of claim 1, wherein the bone conduction headset further comprises an ear hook assembly hung on ears of the user; and
    the sensor assembly comprises an optical sensor, wherein the ear hook assembly is provided with a window for transmitting an optical signal of the optical sensor at a position close to an ear root of the user when the user is wearing the bone conduction headset.

3. The headset communication system of claim 2, wherein the window has a runway-shaped outer contour.

4. The headset communication system of claim 1, wherein the bone conduction headset further comprises a first NFC module;
    the external communication module further comprises a second NFC module, the bone conduction headset and the intercom device exchange Bluetooth addresses through the first NFC module and the second NFC module, so that the first Bluetooth module and the second Bluetooth module are Bluetooth paired to establish the Bluetooth connection.

5. The headset communication system of claim 4, wherein the first NFC module is a passive NFC module; and
    the passive NFC module stores the Bluetooth address of the first Bluetooth module.

6. The headset communication system of claim 4, wherein the ear hook assembly of the bone conducting headset includes an accommodating space, and the first NFC module is arranged in the accommodating space.

7. The headset communication system of claim 1, wherein the bone conduction headset further comprises a speaker assembly, an ear hook assembly, a battery assembly, and a control circuit assembly;
    the speaker assembly is connected to the ear hook assembly; and
    the ear hook assembly includes an accommodating space, and the accommodating space is configured to accommodate the battery assembly and/or the control circuit assembly.

8. The headset communication system of claim 7, wherein the bone conduction headset comprises two speaker assemblies and two ear hook assemblies; and
    the bone conduction headset further comprises a rear hook assembly, the rear hook assembly is configured to connect the two ear hook assemblies.

9. The headset communication system of claim 8, wherein the battery assembly and the control circuit assembly are arranged in the accommodating space of the two ear hook assemblies, respectively.

10. The headset communication system of claim 7, wherein the ear hook assembly comprises a first ear hook shell, a connecting portion, and a second ear hook shell,
    one end of the connecting portion is connected to the first ear hook shell, and the other end of the connecting portion is connected to the speaker assembly, and
    the first ear hook shell and the second ear hook shell are connected to form the accommodating space.

11. The headset communication system of claim 10, wherein the accommodating space has a length direction and a thickness direction, the length direction is perpendicular to the thickness direction,
    the first ear hook shell is spliced to the second ear hook shell along a splicing direction to form the accommodating space, wherein the splicing direction is perpendicular to the length direction and the thickness direction,
    the first ear hook shell includes a first clamping slot and a second clamping slot, the first clamping slot and the second clamping slot are arranged at interval and have a same opening direction,
    the second ear hook shell includes a first clamp block and a second clamp block that are protruded along the length direction and have a same extension direction, wherein the first clamp block is embedded in the first clamp slot, and the second clamp block is embedded in the second clamp slot, thereby limiting relative movements of the first ear hook shell and the second ear hook shell along the splicing direction and the thickness direction, and
    splicing edges of the first ear hook shell and the second ear hook shell fit with each other to restrict relative movements of the first ear hook shell and the second ear hook shell along the length direction.

12. The headset communication system of claim 11, wherein
    the first clamp slot and the second clamp slot are located on two sides of the first ear hook shell along the length direction,
    an opening direction of the first clamp slot faces the accommodating space, and an opening direction of the second clamp slot is away from the accommodating space, the first clamp block and the second clamp block are located on two sides of the second ear hook shell along the length direction, and the extension direction of the first clamp block is away from the first clamp slot, and the extension direction of the second clamp block faces the first clamp slot.

13. The headset communication system of claim 12, wherein a splicing edge of the first ear hook shell is provided with a first stop portion, a splicing edge of the second ear hook shell is provided with a second stop portion, and the first stop portion and the second stop portion fit with each other to limit the relative movements of the first ear hook shell and the second ear hook shell along the length direction.

14. The headset communication system of claim 13, wherein the first clamp slot is arranged on a side of the first ear hook shell that is close to the connecting portion, and the second clamp slot is arranged on a side of the first ear hook shell that is away from the connecting portion.

15. The headset communication system of claim 14, wherein the first ear hook shell is provided with an outer hole section and an inner hole section, the outer hole section and the inner hole section are connected with each other in a direction from an outside of the accommodating space to an inside of the accommodation space, and the outer hole section is filled with a filler, and the inner hole section is the first clamp slot.

16. The headset communication system of claim 12, wherein a part of the second ear hook shell away from the connecting portion is provided with a power jack, the power jack is connected to the accommodating space, and the power jack is configured to accommodate a power interface, the second clamp block is arranged adjacent to the power jack, and the second clamp block is closer to the accommodating space than the power jack, and projections of the second clamp block and the power jack on a first reference plane overlap each other, and the first reference plane is perpendicular to the length direction.

17. The headset communication system of claim 7, wherein the bone conduction headset comprises a microphone assembly, the microphone assembly is rotatably connected to the speaker assembly, the microphone assembly comprises an elastic connecting rod and a sound pickup assembly, one end of the elastic connecting rod is connected to the speaker assembly, the other end of the elastic connecting rod is connected to the sound pickup assembly, and the elastic connecting rod is arranged so that when a vibration of a voice frequency band generated by the speaker assembly is transmitted from one end of the elastic connecting rod to the other end of the elastic connecting rod, an average amplitude attenuation rate of the vibration of the voice frequency band is not less than a predetermined attenuation rate threshold.

18. The headset communication system of claim 17, wherein the elastic connecting rod comprises a microphone elastic metal wire and connectors connected to two ends of the microphone elastic metal wire, wherein a first connector of the connectors is configured to connect and match with the sound pickup assembly, and a second connector of the connectors is configured to connect and match with the speaker assembly, and an elastic modulus of the microphone elastic metal wire is within 70 GPa-90 GPa.

19. The headset communication system of claim 17, wherein the speaker assembly comprises a first speaker shell, a second speaker shell, a speaker, a rotating part, and a pressure holding part, the first speaker shell and the second speaker shell are cooperatively connected to form a receiving space for accommodating the speaker, the first speaker shell is provided with a first through-hole and a second through-hole, the first through-hole and the second through-hole are arranged at intervals, the rotating part is rotatably inserted into the first through-hole, the microphone assembly is connected to the rotating part, the first through-hole and the second through-hole are connected to the receiving space so that a wire group of the microphone assembly passes through the first through-hole, the receiving space, and the second through-hole in turn; and the pressure holding part is arranged in the receiving space and covers the first through-hole for holding the wire group of the microphone assembly to threaded through the first through-hole to the second through-hole.

20. The headset communication system of claim 1, wherein the bone conduction headset further comprises a speaker assembly and a microphone assembly, the microphone assembly is rotatably connected to the speaker assembly, the microphone assembly comprises an elastic connecting rod and a sound pickup assembly, one end of the elastic connecting rod is connected to the speaker assembly, the other end of the elastic connecting rod is connected to the sound pickup assembly, and the elastic connecting rod is arranged so that when a vibration of a voice frequency band generated by the speaker assembly is transmitted from one end of the elastic connecting rod to the other end of the elastic connecting rod.

\* \* \* \* \*